US012684589B2

(12) United States Patent
Liu et al.

(10) Patent No.: US 12,684,589 B2
(45) Date of Patent: Jul. 14, 2026

(54) METHOD AND DEVICE FOR CELL GROUP-BASED HYBRID AUTOMATIC REPEAT REQUEST-ACKNOWLEDGEMENT REPORT IN WIRELESS COMMUNICATIONS

(71) Applicant: Apogee 5G Global, LLC, Plano, TX (US)

(72) Inventors: Zheng Liu, Shanghai (CN); Xiaobo Zhang, Shanghai (CN)

(73) Assignee: APOGEE 5G GLOBAL, LLC, Plano, TX (US)

( * ) Notice: Subject to any disclaimer, the term of this patent is extended or adjusted under 35 U.S.C. 154(b) by 346 days.

(21) Appl. No.: 18/206,619

(22) Filed: Jun. 7, 2023

(65) Prior Publication Data
US 2023/0319847 A1     Oct. 5, 2023

Related U.S. Application Data

(63) Continuation of application No. PCT/CN2021/135659, filed on Dec. 6, 2021.

(30) Foreign Application Priority Data

Dec. 7, 2020    (CN) .......................... 202011418003.9

(51) Int. Cl.
H04W 72/232      (2023.01)
H04L 1/1812      (2023.01)
H04W 72/1263     (2023.01)

(52) U.S. Cl.
CPC ......... H04W 72/232 (2023.01); H04L 1/1812 (2013.01); H04W 72/1263 (2013.01)

(58) Field of Classification Search
CPC ... H04L 1/1806; H04L 1/1812; H04L 1/1861; H04L 2001/0093; H04L 5/0055;
(Continued)

(56) References Cited

U.S. PATENT DOCUMENTS 8,885,752 B2    11/2014   Shirani-Mehr et al.
9,210,675 B2 *  12/2015   Dinan ............... H04W 74/0833
(Continued)

FOREIGN PATENT DOCUMENTS

AU        2020327082 A1 *   3/2022    ............ H04W 72/23
CN          105991263 A    10/2016
(Continued)

OTHER PUBLICATIONS

ISR received in application No. PCT/CN2021/135659 dated Feb. 25, 2022.
(Continued)

*Primary Examiner* — Eric Nowlin
(74) *Attorney, Agent, or Firm* — Volpe Koenig

(57)     ABSTRACT

The application provides a method and device in a node used for wireless communications. A node receives a first information block, and the first information block determines a first search space set; the node monitors a first control channel candidate, and the first control channel candidate belongs to the first search space set; the node transmits a first bit set, the first bit set comprises X bit subsets, and each bit subset comprises a positive integer number of HARQ-ACK bit(s); the X bit subsets are respectively for X cell groups; the first control channel candidate is used for a first serving cell, and the first serving cell belongs to one or multiple cell groups among the X cell groups; the first control channel candidate is used to determine a first identity. The present application guarantees the transmission of HARQ.

17 Claims, 6 Drawing Sheets

(58) Field of Classification Search

CPC .. H04L 5/0091; H04W 4/06; H04W 72/1263; H04W 72/232; Y02D 30/70

See application file for complete search history.

(56) References Cited

U.S. PATENT DOCUMENTS

| | | | | |
|---|---|---|---|---|
| 10,341,057 | B2 * | 7/2019 | Shen | H04L 1/18 |
| 10,630,446 | B2 * | 4/2020 | Seo | H04L 5/0055 |
| 10,772,083 | B2 * | 9/2020 | Kim | H04L 1/0057 |
| 10,785,012 | B2 * | 9/2020 | Pelletier | H04L 5/0053 |
| 10,833,810 | B2 * | 11/2020 | Lee | H04L 1/1861 |
| 10,873,422 | B2 * | 12/2020 | Lee | H04W 76/27 |
| 10,897,779 | B2 * | 1/2021 | Li | H04L 5/0055 |
| 11,310,781 | B2 * | 4/2022 | Kim | H04L 5/0048 |
| 11,349,614 | B2 * | 5/2022 | Karaki | H04L 5/0055 |
| 11,394,522 | B2 * | 7/2022 | Pelletier | H04L 5/0094 |
| 11,425,745 | B2 * | 8/2022 | Cirik | H04W 72/53 |
| 11,432,272 | B2 * | 8/2022 | Solano Arenas | H04L 5/0094 |
| 11,438,125 | B2 | 9/2022 | Zhang | |
| 11,723,035 | B2 * | 8/2023 | Saber | H04W 8/24 370/329 |
| 11,785,618 | B2 * | 10/2023 | Jiang | H04L 1/1896 370/329 |
| 11,792,772 | B2 * | 10/2023 | Lee | H04L 5/0053 370/329 |
| 12,041,609 | B2 * | 7/2024 | He | H04L 5/0064 |
| 12,047,324 | B2 * | 7/2024 | Lee | H04L 1/1812 |
| 12,082,201 | B2 * | 9/2024 | Yi | H04W 72/23 |
| 12,133,099 | B2 * | 10/2024 | Nimbalker | H04W 72/23 |
| 12,206,506 | B2 * | 1/2025 | Wei | H04L 1/1854 |
| 12,212,525 | B2 * | 1/2025 | Zhang | H04L 5/0055 |
| 12,245,295 | B2 * | 3/2025 | Jung | H04W 74/0841 |
| 12,250,734 | B2 * | 3/2025 | Jung | H04W 52/325 |
| 12,262,391 | B2 * | 3/2025 | Wu | H04W 72/23 |
| 12,289,776 | B2 * | 4/2025 | Jung | H04W 24/08 |
| 12,342,340 | B2 * | 6/2025 | Liu | H04W 24/08 |
| 2013/0039290 | A1 | 2/2013 | Harrison et al. | |
| 2013/0188617 | A1 * | 7/2013 | Dinan | H04W 74/0833 370/336 |
| 2016/0212734 | A1 | 7/2016 | He et al. | |
| 2018/0115966 | A1 | 4/2018 | Chen | |
| 2018/0123769 | A1 * | 5/2018 | Pelletier | H04L 5/001 |
| 2018/0241510 | A1 * | 8/2018 | Shen | H04L 1/18 |
| 2019/0068331 | A1 * | 2/2019 | Lee | H04L 1/1864 |
| 2019/0159251 | A1 * | 5/2019 | Li | H04L 1/18 |
| 2020/0029338 | A1 * | 1/2020 | Lee | H04W 72/542 |
| 2020/0145140 | A1 * | 5/2020 | Lee | H04L 1/1864 |
| 2020/0229161 | A1 * | 7/2020 | Raghavan | H04W 24/10 |
| 2020/0295878 | A1 | 9/2020 | Choi et al. | |
| 2020/0305134 | A1 | 9/2020 | Noh et al. | |
| 2020/0314880 | A1 * | 10/2020 | Cirik | H04W 72/1273 |
| 2020/0344012 | A1 * | 10/2020 | Karaki | H04L 1/1812 |
| 2020/0359373 | A1 * | 11/2020 | Kim | H04L 5/0048 |
| 2020/0374094 | A1 * | 11/2020 | Pelletier | H04L 5/0094 |
| 2020/0396760 | A1 * | 12/2020 | Yi | H04W 72/23 |
| 2021/0127285 | A1 * | 4/2021 | Khoshnevisan | H04L 5/0053 |
| 2021/0144599 | A1 * | 5/2021 | Awoniyi-Oteri | H04L 5/0053 |
| 2021/0152292 | A1 * | 5/2021 | Fu | H04W 52/48 |
| 2021/0227511 | A1 * | 7/2021 | Solano Arenas | H04L 5/0082 |
| 2021/0377918 | A1 * | 12/2021 | Saber | H04W 8/24 |
| 2021/0409182 | A1 * | 12/2021 | Lee | H04L 5/0055 |
| 2022/0116969 | A1 * | 4/2022 | He | H04L 5/0064 |
| 2022/0150734 | A1 * | 5/2022 | Nimbalker | H04L 1/0038 |
| 2022/0182976 | A1 * | 6/2022 | Jiang | H04W 72/0453 |
| 2022/0201562 | A1 * | 6/2022 | Liu | H04L 1/1614 |
| 2022/0263608 | A1 * | 8/2022 | Wei | H04L 1/1854 |
| 2022/0264341 | A1 * | 8/2022 | Liu | H04W 72/23 |
| 2022/0278807 | A1 * | 9/2022 | Zhang | H04L 1/1812 |
| 2022/0303961 | A1 * | 9/2022 | Wu | H04W 72/23 |
| 2022/0304014 | A1 * | 9/2022 | Li | H04L 5/0092 |
| 2022/0329400 | A1 * | 10/2022 | Pelletier | H04L 5/001 |
| 2022/0377812 | A1 * | 11/2022 | Jung | H04W 74/0841 |
| 2022/0386387 | A1 * | 12/2022 | Jung | H04W 74/002 |
| 2022/0386388 | A1 * | 12/2022 | Jung | H04L 5/0053 |
| 2023/0023017 | A1 * | 1/2023 | Liu | H04L 5/0053 |
| 2023/0085896 | A1 * | 3/2023 | Takeda | H04L 5/0044 |
| 2023/0345483 | A1 * | 10/2023 | Fu | H04L 5/0055 |
| 2023/0413294 | A1 * | 12/2023 | Jiang | H04L 1/1896 |
| 2025/0088337 | A1 * | 3/2025 | Zhang | H04W 72/0446 |
| 2025/0260549 | A1 * | 8/2025 | Pelletier | H04L 5/0094 |
| 2026/0019195 | A1 * | 1/2026 | Khoshnevisan | H04L 1/1812 |

FOREIGN PATENT DOCUMENTS

| | | | | |
|---|---|---|---|---|
| CN | 109863714 | A | 6/2019 | |
| CN | 110300433 | A | 10/2019 | |
| CN | 110505706 | A | 11/2019 | |
| CN | 110535609 | A * | 12/2019 | H04L 5/0055 |
| CN | 110536435 | A | 12/2019 | |
| CN | 114598417 | A * | 6/2022 | H04W 72/30 |
| CN | 116456285 | A * | 7/2023 | H04L 5/0055 |
| CN | 110535609 | B * | 11/2023 | H04L 1/1812 |
| CN | 117394957 | A * | 1/2024 | H04L 1/0027 |
| CN | 114666021 | B * | 3/2024 | H04L 5/003 |
| CN | 114598417 | B * | 11/2024 | H04W 72/0453 |
| CN | 114765746 | B * | 1/2025 | H04L 5/0055 |
| CN | 116114345 | B * | 5/2025 | H04L 5/0094 |
| EP | 4009562 | A1 * | 6/2022 | H04W 72/23 |
| EP | 4187827 | A1 * | 5/2023 | H04W 72/23 |
| IN | 111918379 | A | 11/2020 | |
| KR | 20240163124 | A * | 11/2024 | H04W 72/21 |
| WO | 2018028444 | A1 | 2/2018 | |
| WO | 2020090367 | A1 | 5/2020 | |
| WO | WO-2021023091 | A1 * | 2/2021 | H04W 72/23 |
| WO | WO-2022027508 | A1 * | 2/2022 | H04W 72/23 |

OTHER PUBLICATIONS

First Office Action of Chinese patent application No. CN202011418003.9 dated Oct. 19, 2022.

First Search Report of Chinese patent application No. CN202011418003.9 dated Sep. 19, 2022.

Notification to Grant Patent Right for Invention of Chinese patent application No. CN202011418003.9 dated Jan. 29, 2023.

Vivo HARQ-ACK enhancements for Rel-17 URLLC 3GPP TSG RAN WG1#103-e R1-2007655 Nov. 13, 2020.

European extended search report received in application EP21902537.6 dated Apr. 9, 2024.

Third Generation Partnership Project, "Technical Specification Group Radio Access Network; NR; Physical layer procedures for control (Release 16)," 3GPP TS 38.213 V16.3.0 (Sep. 2020).

Third Generation Partnership Project, "Technical Specification Group Radio Access Network; NR; Radio Resource Control (RRC) protocol specification (Release 16)," 3GPP TS 38.331 V16.2.0 (Sep. 2020).

* cited by examiner

Case A

Case B

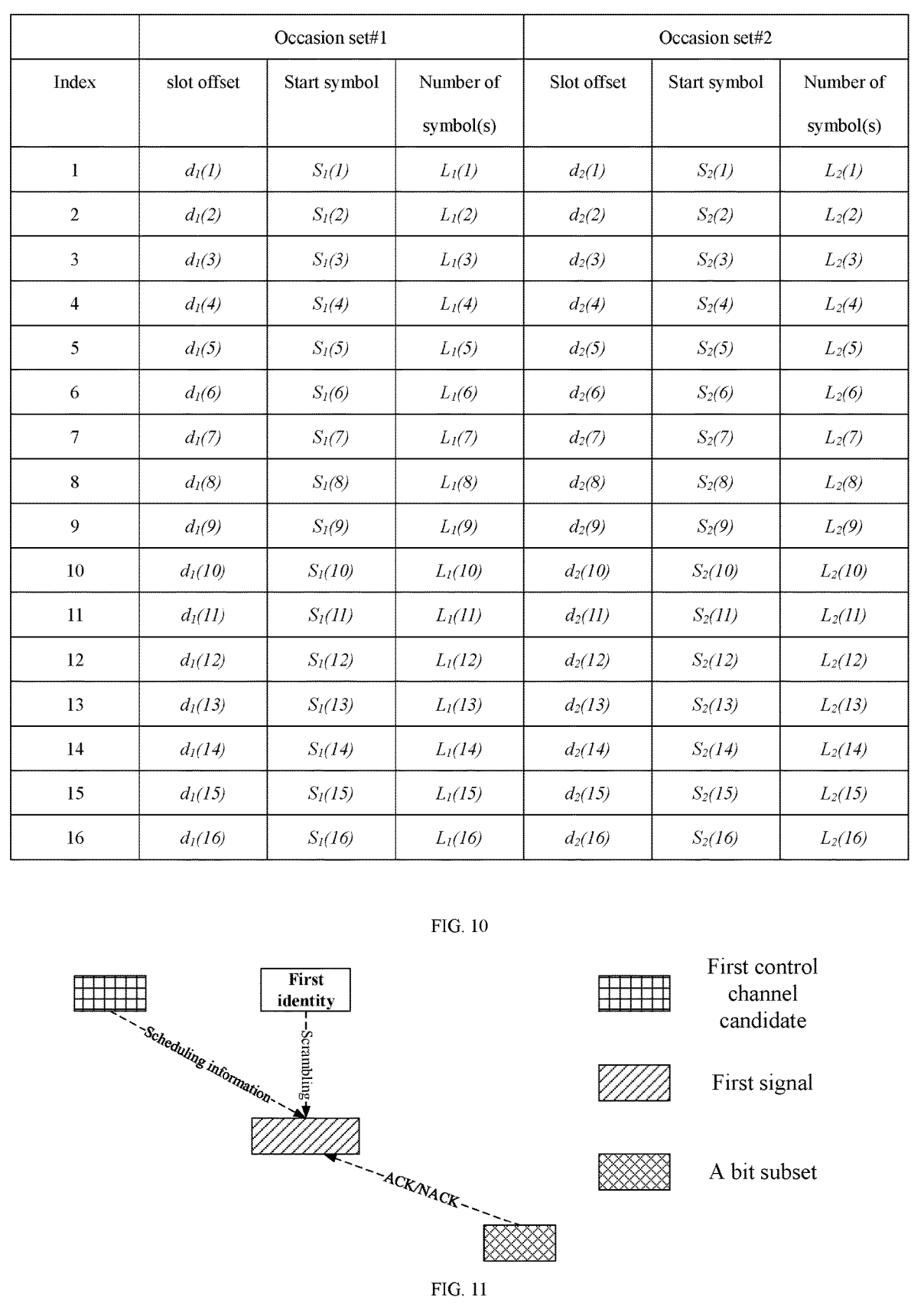

| Index | Occasion set#1 | | | Occasion set#2 | | |
|---|---|---|---|---|---|---|
| | slot offset | Start symbol | Number of symbol(s) | Slot offset | Start symbol | Number of symbol(s) |
| 1 | $d_1(1)$ | $S_1(1)$ | $L_1(1)$ | $d_2(1)$ | $S_2(1)$ | $L_2(1)$ |
| 2 | $d_1(2)$ | $S_1(2)$ | $L_1(2)$ | $d_2(2)$ | $S_2(2)$ | $L_2(2)$ |
| 3 | $d_1(3)$ | $S_1(3)$ | $L_1(3)$ | $d_2(3)$ | $S_2(3)$ | $L_2(3)$ |
| 4 | $d_1(4)$ | $S_1(4)$ | $L_1(4)$ | $d_2(4)$ | $S_2(4)$ | $L_2(4)$ |
| 5 | $d_1(5)$ | $S_1(5)$ | $L_1(5)$ | $d_2(5)$ | $S_2(5)$ | $L_2(5)$ |
| 6 | $d_1(6)$ | $S_1(6)$ | $L_1(6)$ | $d_2(6)$ | $S_2(6)$ | $L_2(6)$ |
| 7 | $d_1(7)$ | $S_1(7)$ | $L_1(7)$ | $d_2(7)$ | $S_2(7)$ | $L_2(7)$ |
| 8 | $d_1(8)$ | $S_1(8)$ | $L_1(8)$ | $d_2(8)$ | $S_2(8)$ | $L_2(8)$ |
| 9 | $d_1(9)$ | $S_1(9)$ | $L_1(9)$ | $d_2(9)$ | $S_2(9)$ | $L_2(9)$ |
| 10 | $d_1(10)$ | $S_1(10)$ | $L_1(10)$ | $d_2(10)$ | $S_2(10)$ | $L_2(10)$ |
| 11 | $d_1(11)$ | $S_1(11)$ | $L_1(11)$ | $d_2(11)$ | $S_2(11)$ | $L_2(11)$ |
| 12 | $d_1(12)$ | $S_1(12)$ | $L_1(12)$ | $d_2(12)$ | $S_2(12)$ | $L_2(12)$ |
| 13 | $d_1(13)$ | $S_1(13)$ | $L_1(13)$ | $d_2(13)$ | $S_2(13)$ | $L_2(13)$ |
| 14 | $d_1(14)$ | $S_1(14)$ | $L_1(14)$ | $d_2(14)$ | $S_2(14)$ | $L_2(14)$ |
| 15 | $d_1(15)$ | $S_1(15)$ | $L_1(15)$ | $d_2(15)$ | $S_2(15)$ | $L_2(15)$ |
| 16 | $d_1(16)$ | $S_1(16)$ | $L_1(16)$ | $d_2(16)$ | $S_2(16)$ | $L_2(16)$ |

FIG. 10

First identity

Scheduling information

Scrambling

ACK/NACK

First control channel candidate

First signal

A bit subset

FIG. 11

METHOD AND DEVICE FOR CELL GROUP-BASED HYBRID AUTOMATIC REPEAT REQUEST-ACKNOWLEDGEMENT REPORT IN WIRELESS COMMUNICATIONS

CROSS REFERENCE TO RELATED APPLICATIONS

This application is the continuation of the international patent application No. PCT/CN2021/135659, filed on Dec. 6, 2021, and claims the priority benefit of Chinese Patent Application No. 202011418003.9, filed on Dec. 7, 2020, the full disclosure of which is incorporated herein by reference.

BACKGROUND

Technical Field

The present application relates to transmission methods and devices in wireless communication systems, and in particular to a transmission scheme and device of groupcast, multicast or broadcast in wireless communications.

Related Art

Application scenarios of future wireless communication systems are becoming increasingly diversified, and different application scenarios have different performance demands on systems. In order to meet different performance requirements of various application scenarios, it was decided at 3rd Generation Partner Project (3GPP) Radio Access Network (RAN) #72th plenary that a study on New Radio (NR), or what is called Fifth Generation (5G) shall be conducted. The work item of NR was approved at 3GPP RAN #75th plenary to standardize NR. A Study Item (SI) and a Work Item (WI) of NR Rel-17 were decided to be started at 3GPP RAN #86 plenary.

Many application scenarios adopting NR technology need to support multicast and broadcast traffic transmission, such as firmware upgrade, videocast, etc. In NR Rel-17, in order to support multicast and broadcast traffic, a Work Item (WI) of multicast and broadcast traffic under NR was approved at 3GPP RAN #86 plenary, where related standardization work was started.

SUMMARY

HARQ feedback for multicast/broadcast transmission is supported in a WI of multicast and broadcast transmission to improve the robustness of multicast/broadcast transmission. To address the HARQ feedback problem of multicast/broadcast transmission, the present application provides a solution. It should be noted that though the present application only took multicast/broadcast transmission for example or as a typical scenario in the statement above; the present application is also applicable to other scenarios confronting similar problems (such as the scenarios where multiple traffics coexist, or the scenario where multiple parallel downlink transmissions exist for a same UE in a serving cell), where similar technical effects can be achieved. Additionally, the adoption of a unified solution for various scenarios, including but not limited to scenarios of multicast/broadcast transmission, contributes to the reduction of hardware complexity and costs. If no conflict is incurred, embodiments in a first node in the present application and the characteristics of the embodiments are also applicable to a second node, and vice versa. Particularly, for interpretations of the terminology, nouns, functions and variants (if not specified) in the present application, refer to definitions given in TS36 series, TS38 series and TS37 series of 3GPP specifications.

The present application provides a method in a first node for wireless communications, comprising:

receiving a first information block, the first information block being used to determine a first search space set, the first search space set comprising a positive integer number of control channel candidate(s);

monitoring a first control channel candidate, the first control channel candidate being one of a positive integer number of control channel candidate(s) comprised in the first search space set; and transmitting a first bit set, the first bit set comprising X bit subsets, each of the X bit subsets comprising a positive integer number of HARQ-ACK bit(s), X being a positive integer greater than 1;

herein, the X bit subsets are respectively for X cell groups, and any of the X cell groups comprises a positive integer number of serving cell(s); the first control channel candidate is used for a first serving cell, and the first serving cell belongs to one or multiple cell groups among the X cell groups; the first control channel candidate is used to determine a first identity, and at least one of the first search space set or the first identity is used to determine at least a cell group to which the first serving cell belongs from the X cell groups.

In one embodiment, with a first serving cell belonging to multiple cell groups, a HARQ-ACK of groupcast or multicast transmission is regarded as a virtual cell for generating a HARQ-ACK codebook when it is for HARQ-ACK feedback of groupcast or broadcast traffic, so as to ensure the transmission of HARQ-ACK of groupcast or multicast traffic and the effective multiplexing with HARQ-ACK of other traffic (such as unicast), and in particularly to support frequency-division multiplexing between groupcast or multicast traffic and unicast traffic, thus improving transmission performance.

In one embodiment, a cell group to which a first serving cell belongs is determined according to at least one of a search space set or a first identity, so that when a HARQ-ACK codebook of a HARQ-ACK comprising groupcast or multicast traffic is constructed, determination of an implicit HARQ-ACK codebook is implemented, which ensures an accurate transmission of the HARQ-ACK, thus reducing the signaling overhead.

According to one aspect of the present application, the above method is characterized in that the X cell groups are sequentially indexed, and at least one of the first search space set or the first identity is used to determine an index of at least a cell group to which the first serving cell belongs; the X bit subsets are concatenated to generate the first bit set, and an order of indexes of the X cell groups is used to determine a concatenation order of the X bit subsets.

According to one aspect of the present application, the above method is characterized in that the first search space set is associated with a first control resource set, the first control resource set belongs to a first control resource pool, and an index of the first control resource pool is used to determine a cell group to which the first serving cell belongs from the X cell groups.

In one embodiment, a cell group to which a first serving cell belongs is determined through an index of a first control resource pool, thus ensuring the accurate transmission of HARQ-ACK and further improving link performance by considering a HARQ-ACK transmission of groupcast or broadcast traffic and a HARQ-ACK of multi-TRP unicast traffic at the same time.

According to one aspect of the present application, the above method is characterized in comprising:

receiving a second information block;

herein, the second information block is used to determine a first time-domain resource set, and the first time-domain resource set comprises more than one time-domain resource block; the first control channel candidate is used to determine a target time-domain resource block, the target time-domain resource block belongs to a second time-domain resource set, and the second time-domain resource set comprises more than one time-domain resource block; whether there exist completely or partially overlapping time-domain resource blocks between the first time-domain resource set and the second time-domain resource set is used to determine the X cell groups.

In one embodiment, X cell groups are determined by whether there exist completely or partially overlapping time-domain resource blocks between a first time-domain resource set and a second time-domain resource set, so as to support a determination method of a sub-codebook of an implicit HARQ-ACK codebook, and header overhead of HARQ-ACK codebooks and overhead for configuring a signalsing are saved as much as possible while the multiplexing transmission of HARQ-ACK of groupcast or broadcast traffic and HARQ-ACK of unicast traffic are ensured.

According to one aspect of the present application, the above method is characterized in that a first bit subset is one of the X bit subsets, the first bit subset comprises a first bit block, the first bit block comprises a positive integer number of bit(s), and any bit comprised in the first bit block belongs to the first bit subset; the first bit block corresponds to a first time-domain occasion, the first time-domain occasion is a time-domain occasion comprised in a first occasion set, the first occasion set comprises a positive integer number of time-domain occasion(s), and a position of the first time-domain occasion in the first occasion set is used to determine the first bit block from the first bit subset.

According to one aspect of the present application, the above method is characterized in that the first occasion set is one of M occasion set(s), and any of the M occasion set(s) comprises a positive integer number of time-domain occasion(s), M being a positive integer; when M is greater than 1, at least one of the first search space set or the first identity is used to determine the first occasion set from the M occasion set(s).

In one embodiment, by introducing multiple occasion sets, a first occasion set is determined according to at least one of a first search space set or a first identity, an separate time-domain resource allocation list (comprising a slot interval and an SLIV) is introduced for groupcast or multicast traffic, a flexible configuration of groupcast or broadcast traffic is supported, requirements for different groupcast or broadcast traffic are considered when designing HARQ-ACK codebooks, and the transmission performance of groupcast or multicast traffic is optimized to ensure the effectiveness of the HARQ-ACK.

According to one aspect of the present application, the above method is characterized in comprising:

receiving a first signal;

herein, information carried by the first control channel candidate is used to determine time-frequency resources occupied by the first signal; the first identity is used for a scrambling sequence of the first signal, the first signal belongs to the first serving cell, and one of the X bit subsets is used to indicate whether the first signal is correctly received.

The present application provides a method in a second node for wireless communications, comprising:

transmitting a first information block, the first information block being used to indicate a first search space set, the first search space set comprising a positive integer number of control channel candidate(s);

determining a first control channel candidate, the first control channel candidate being one of a positive integer number of control channel candidate(s) comprised in the first search space set;

receiving a first bit set, the first bit set comprising X bit subsets, each of the X bit subsets comprising a positive integer number of HARQ-ACK bit(s), X being a positive integer greater than 1;

herein, the X bit subsets are respectively for X cell groups, and any of the X cell groups comprises a positive integer number of serving cell(s); the first control channel candidate is used for a first serving cell, and the first serving cell belongs to one or multiple cell groups among the X cell groups; the first control channel candidate is used to determine a first identity, and at least one of the first search space set or the first identity is used to determine at least a cell group to which the first serving cell belongs from the X cell groups.

According to one aspect of the present application, the above method is characterized in that the X cell groups are sequentially indexed, and at least one of the first search space set or the first identity is used to determine an index of at least a cell group to which the first serving cell belongs; the X bit subsets are concatenated to generate the first bit set, and an order of indexes of the X cell groups is used to determine a concatenation order of the X bit subsets.

According to one aspect of the present application, the above method is characterized in that the first search space set is associated with a first control resource set, the first control resource set belongs to a first control resource pool, and an index of the first control resource pool is used to determine a cell group to which the first serving cell belongs from the X cell groups.

According to one aspect of the present application, the above method is characterized in comprising:

transmitting a second information block;

herein, the second information block is used to indicate a first time-domain resource block, and the first time-domain resource set comprises more than one time-domain resource block; the first control channel candidate is used to determine a target time-domain resource block, the target time-domain resource block belongs to a second time-domain resource set, and the second time-domain resource set comprises more than one time-domain resource block; whether there exist completely or partially overlapping time-domain resource blocks between the first time-domain resource set and the second time-domain resource set is used to determine the X cell groups.

According to one aspect of the present application, the above method is characterized in that a first bit subset is one of the X bit subsets, the first bit subset comprises a first bit block, the first bit block comprises a positive integer number of bit(s), and any bit comprised in the first bit block belongs to the first bit subset; the first bit block corresponds to a first time-domain occasion, the first time-domain occasion is a time-domain occasion comprised in a first occasion set, the first occasion set comprises a positive integer number of time-domain occasion(s), and a position of the first time-domain occasion in the first occasion set is used to determine the first bit block from the first bit subset.

According to one aspect of the present application, the above method is characterized in that the first occasion set is one of M occasion set(s), and any of the M occasion set(s) comprises a positive integer number of time-domain occasion(s), M being a positive integer; when M is greater than 1, at least one of the first search space set or the first identity is used to determine the first occasion set from the M occasion set(s).

According to one aspect of the present application, the above method is characterized in comprising:

transmitting a first signal;

herein, information carried by the first control channel candidate is used to determine time-frequency resources occupied by the first signal; the first identity is used for a scrambling sequence of the first signal, the first signal belongs to the first serving cell, and one of the X bit subsets is used to indicate whether the first signal is correctly received.

The present application provides a first node for wireless communications, comprising:

a first receiver, receiving a first information block, the first information block being used to determine a first search space set, the first search space set comprising a positive integer number of control channel candidate(s);

a second receiver, monitoring a first control channel candidate, the first control channel candidate being one of a positive integer number of control channel candidate(s) comprised in the first search space set; and a first transmitter, transmitting a first bit set, the first bit set comprising X bit subsets, each of the X bit subsets comprising a positive integer number of HARQ-ACK bit(s), X being a positive integer greater than 1;

herein, the X bit subsets are respectively for X cell groups, and any of the X cell groups comprises a positive integer number of serving cell(s); the first control channel candidate is used for a first serving cell, and the first serving cell belongs to one or multiple cell groups among the X cell groups; the first control channel candidate is used to determine a first identity, and at least one of the first search space set or the first identity is used to determine at least a cell group to which the first serving cell belongs from the X cell groups.

The present application provides a second node for wireless communications, comprising:

a second transmitter, transmitting a first information block, the first information block being used to indicate a first search space set, the first search space set comprising a positive integer number of control channel candidate(s);

a third transmitter, determining a first control channel candidate, the first control channel candidate being one of a positive integer number of control channel candidate(s) comprised in the first search space set; and a third receiver, receiving a first bit set, the first bit set comprising X bit subsets, each of the X bit subsets comprising a positive integer number of HARQ-ACK bit(s), X being a positive integer greater than 1;

herein, the X bit subsets are respectively for X cell groups, and any of the X cell groups comprises a positive integer number of serving cell(s); the first control channel candidate is used for a first serving cell, and the first serving cell belongs to one or multiple cell groups among the X cell groups; the first control channel candidate is used to determine a first identity, and at least one of the first search space set or the first identity is used to determine at least a cell group to which the first serving cell belongs from the X cell groups.

In one embodiment, the method in the present application is advantageous in the following aspects:

by adopting the method in the present application, a HARQ-ACK of groupcast or multicast transmission is regarded as a virtual cell to generate a HARQ-ACK codebook when it is for HARQ-ACK feedback of groupcast or broadcast traffic, so that the transmission of HARQ-ACK of groupcast or multicast traffic and the effective multiplexing with HARQ-ACK of other traffic (such as unicast) are ensured, and in particularly frequency-division multiplexing between groupcast or multicast traffic and unicast traffic is supported, which improves the transmission performance.

by adopting the method in the present application, when a HARQ-ACK codebook of a HARQ-ACK comprising groupcast or multicast traffic is constructed, determination of an implicit HARQ-ACK codebook is implemented, which ensures an accurate transmission of the HARQ-ACK, thus reducing the signaling overhead;

by adopting the method in the present application, a HARQ-ACK transmission of groupcast or broadcast traffic and a HARQ-ACK of multi-TRP unicast traffic are considered at the same time, so that the accurate transmission of HARQ-ACK is ensured, thus further improving link performance;

the method in the present application supports a determination method of a sub-codebook of an implicit HARQ-ACK codebook, and header overhead of a HARQ-ACK codebook and overhead for configuring a signaling are saved as much as possible while the multiplexing transmission of a HARQ-ACK of groupcast or broadcast traffic and a HARQ-ACK of unicast traffic are ensured;

the method in the present application introduces a separate time-domain resource allocation list for groupcast or multicast traffic (comprising a slot interval and an SLIV), the flexible configuration of groupcast or broadcast traffic is supported, and requirements for different groupcast or broadcast traffic are considered when designing a HARQ-ACK codebook, so that the transmission performance of groupcast or multicast traffic is optimized to ensure the effectiveness of the HARQ-ACK.

BRIEF DESCRIPTION OF THE DRAWINGS

Other features, objects and advantages of the present application will become more apparent from the detailed description of non-restrictive embodiments taken in conjunction with the following drawings:

FIG. 10 illustrates a schematic diagram of M occasion set(s) according to one embodiment of the present application;

FIG. 11 illustrates a schematic diagram of a first signal according to one embodiment of the present application;

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
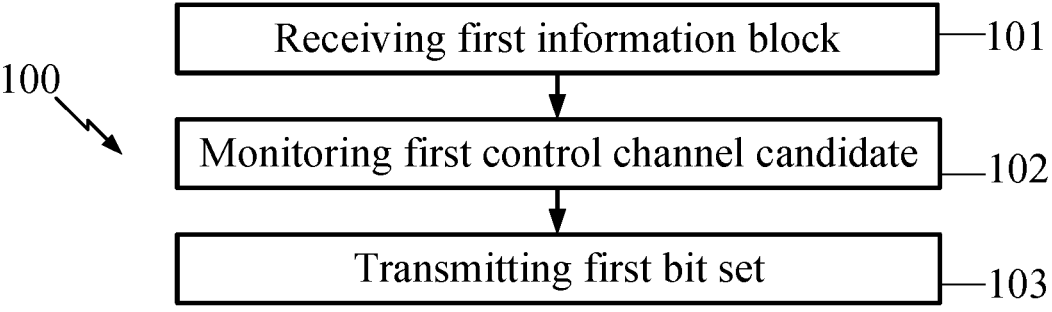
FIG. 1 illustrates a flowchart of a first information block, a first control channel candidate and a first bit set according to one embodiment of the present application.

Embodiment 1 illustrates a flowchart of a first information block, a first control channel candidate and a first bit set according to one embodiment of the present application, as shown in FIG. 1. In FIG. 1, each box represents a step. Particularly, the sequential order of steps in these boxes does not necessarily mean that the steps are chronologically arranged.

In embodiment 1, a first node in the present application receives a first information block in step 101, the first information block is used to determine a first search space set, the first search space set comprising a positive integer number of control channel candidate(s); the first node in the present application monitors a first control channel candidate in step 102, the first control channel candidate is one of a positive integer number of control channel candidate(s) comprised in the first search space set; the first node in the present application transmits a first bit set in step 103, the first bit set comprises X bit subsets, each of the X bit subsets comprises a positive integer number of HARQ-ACK bit(s), X being a positive integer greater than 1; herein, the X bit subsets are respectively for X cell groups, and any of the X cell groups comprises a positive integer number of serving cell(s); the first control channel candidate is used for a first serving cell, and the first serving cell belongs to one or multiple cell groups among the X cell groups; the first control channel candidate is used to determine a first identity, and at least one of the first search space set or the first identity is used to determine at least a cell group to which the first serving cell belongs from the X cell groups.

In one embodiment, the first information block is transmitted via an air interface.

In one embodiment, the first information block is transmitted through a radio interface.

In one embodiment, a transmitter of the first information block comprises the second node in the present application.

In one embodiment, the first information block comprises all or part of a higher-layer signaling.

In one embodiment, the first information block comprises all or part of a physical-layer signaling.

In one embodiment, the first information block comprises all or part of a Radio Resource Control (RRC) layer signaling.

In one embodiment, the first information block comprises all or part of a Medium Access Control (MAC) layer signaling.

In one embodiment, the first information block comprises all or part of a System Information Block (SIB).

In one embodiment, the first information is transmitted through a DL-SCH.

In one embodiment, the first information block is transmitted through a Physical Downlink Shared Channel (PDSCH).

In one embodiment, the first information block is Cell-Specific.

In one embodiment, the first information block is UE-specific.

In one embodiment, the first information block is configured by Per Serving Cell.

In one embodiment, the first information block comprises all or partial fields of a Downlink Control Information (DCI) signaling.

In one embodiment, the first information block comprises more than one sub-information block, and each sub-information block comprised in the first information block is an IE or a field in an RRC signaling to which the first information block belongs; one or multiple sub-information blocks comprised in the first information block is used to indicate the first search space set.

In one embodiment, the first information block comprises all or partial fields in an IE "BWP-Downlink" in an RRC signaling.

In one embodiment, the first information block comprises all or partial fields in an IE "BWP-DownlinkDedicated" in an RRC signaling.

In one embodiment, the first information block comprises all or partial fields in an IE "PDCCH-Config" in an RRC signaling.

In one embodiment, the first information block comprises all or partial fields in an IE "PDCCH-ConfigPTM" in an RRC signaling.

In one embodiment, the first information block comprises all or partial fields in an IE "SearchSpace" in an RRC signaling.

In one embodiment, the expression in the claim that "the first information block is used to determine a first search space set" comprises the following meaning: the first information block is used by the first node in the present application to determine the first search space set.

In one embodiment, the expression in the claim that "the first information block is used to determine a first search space set" comprises the following meaning: the first information block explicitly indicates the first search space set.

In one embodiment, the expression in the claim that "the first information block is used to determine a first search space set" comprises the following meaning: the first information block implicitly indicates the first search space set.

In one embodiment, the expression in the claim that "the first information block is used to determine a first search space set" comprises the following meaning: the first information block is used to indicate configuration parameters of the first search space set.

In one embodiment, the expression in the claim that "the first information block is used to determine a first search space set" comprises the following meaning: the first information block is used to determine a control channel candidate comprised in the first search space set.

In one embodiment, the first search space set is a UE-Specific Search Space Set (USS Set).

In one embodiment, the first search space set is a Cell-Specific Search Space Set (CSS Set).

In one embodiment, the first search space set is a Search Space Set of a Physical Downlink Control Channel (PDCCH).

In one embodiment, the first search space set is a CSS Set of Type0-PDCCH.

In one embodiment, the first search space set is a CSS Set of Type1-PDCCH.

In one embodiment, the first search space set is a CSS Set of Type0A-PDCCH.

In one embodiment, the first search space set is a CSS Set of Type2-PDCCH.

In one embodiment, the first search space set is a CSS Set of Type3-PDCCH.

In one embodiment, the first search space set is a CSS Set of Type4-PDCCH.

In one embodiment, the first search space set is a CSS Set of Type5-PDCCH.

In one embodiment, a number of control channel candidate(s) comprised in the first search space set is equal to 1.

In one embodiment, a number of control channel candidates comprised in the first search space set is greater than 1.

In one embodiment, any control channel candidate comprised in the first search space set occupies a positive integer number of Control Channel Element(s) (CCE(s)) in time-frequency domain.

In one embodiment, a number of CCE(s) occupied by any control channel candidate comprised in the first search space set is equal to one of 1, 2, 4, 8 and 16.

In one embodiment, any control channel candidate comprised in the first search space set is a Physical Downlink Control Channel (PDCCH) candidate.

In one embodiment, any control channel candidate comprised in the first search space set is a Monitored PDCCH Candidate.

In one embodiment, any control channel candidate comprised in the first search space set is a PDCCH candidate adopting one or multiple DCI formats.

In one embodiment, any control channel candidate comprised in the first search space set is a PDCCH candidate adopting one or multiple DCI payload sizes.

In one embodiment, the first search space set comprises two control channel candidates occupying same time-frequency resources.

In one embodiment, indexes of any two control channel candidates comprised in the first Search Space Set are different.

In one embodiment, CCEs occupied by any two control channel candidates comprised in the first Search Space Set are different.

In one embodiment, the first Search Space Set comprises two control channel candidates occupying a same CCE set.

In one embodiment, monitoring on the first control channel candidate is decoding for the first control channel candidate.

In one embodiment, monitoring on the first control channel candidate is Blind Decoding for the first control channel candidate.

In one embodiment, monitoring on the first control channel candidate is decoding for the first control channel candidate and CRC check.

In one embodiment, monitoring on the first control channel candidate is decoding for the first control channel candidate and a CRC check scrambled by a Radio Network Temporary Identity (RNTI).

In one embodiment, monitoring on the first control channel candidate is decoding for the first control channel candidate based on the monitored DCI format(s).

In one embodiment, monitoring on the first control channel candidate is decoding for the first control channel candidate based on the monitored one or multiple DCI format(s).

In one embodiment, the first control channel candidate is any control channel candidate comprised in the first search space set.

In one embodiment, the first control channel candidate is a specific control channel candidate comprised in the first search space set.

In one embodiment, the first control channel candidate is a control channel candidate comprised in a subset comprised in the first search space set.

In one embodiment, the first control channel candidate is a control channel candidate with a minimum or maximum index comprised in the first search space set.

In one embodiment, the first control channel candidate is a control channel candidate in control channel candidates adopting specific DCI formats comprised in the first search space set.

In one embodiment, the first control channel candidate is a control channel candidate in control channel candidates supporting specific DCI formats of RNTIs comprised in the first search space set.

In one embodiment, the first control channel candidate is a control channel candidate in control channel candidates supporting DCI formats of a Group Radio Network Temporary Identity (G-RNTI) comprised in the first search space set.

In one embodiment, the first node in the present application also monitors a control signaling candidate other than the first control channel candidate comprised in the first search space set.

In one embodiment, the first node in the present application only monitors the first control channel candidate comprised in the first search space set.

In one embodiment, the first bit set comprises one or multiple fields in Uplink Control Information (UCI).

In one embodiment, a bit comprised in the first bit set belongs to a Uplink Control Information (UCI) payload.

In one embodiment, the first bit set is a Hybrid Automatic Repeat Request-Acknowledgement (HARQ-ACK) codebook.

In one embodiment, each bit comprised in the first bit set is a HARQ-ACK bit.

In one embodiment, the first bit set is a Type-1 HARQ-ACK codebook.

In one embodiment, the first bit set is a Type-2 HARQ-ACK codebook.

In one embodiment, the first bit set is a Type-3 HARQ-ACK codebook.

In one embodiment, the first bit set is a Type-4 HARQ-ACK codebook.

In one embodiment, the first bit set is carried through an uplink channel.

In one embodiment, the first bit set is carried through a Physical Uplink Control Channel (PUCCH).

In one embodiment, the first bit set is piggybacked through a Physical Uplink Shared Channel (PUSCH).

In one embodiment, X is equal to 2.

In one embodiment, X is equal to 3.

In one embodiment, X is greater than 3.

In one embodiment, any of the X bit subsets comprises more than one Hybrid Automatic Repeat Request-Acknowledgement (HARQ-ACK) bit.

In one embodiment, there exists one of the X bit subsets only comprising one HARQ-ACK bit.

In one embodiment, there exists one of the X bit subsets comprising more than one HARQ-ACK bit.

In one embodiment, any of the X bit subsets is a HARQ-ACK codebook.

In one embodiment, any of the X bit subsets is a HARQ-ACK sub-codebook.

In one embodiment, any of the X bit subsets is a subset of a HARQ-ACK codebook.

In one embodiment, any bit comprised in any of the X bit subsets is used to indicate an ACK or a Non-Acknowledgement (NACK).

In one embodiment, there exists one of the X cell groups comprising a Primary Cell (Pcell).

In one embodiment, there exists one of the X cell groups comprising a Secondary Cell (Scell).

In one embodiment, there exists one of the X cell groups comprising a Special Cell (SPCell).

In one embodiment, the X cell groups are sequentially indexed.

In one embodiment, serving cells comprised in any of the X cell groups are sequentially indexed.

In one embodiment, serving cells comprised in any of the X cell groups are arranged according to indexes of serving cells.

In one embodiment, serving cells comprised in any of the X cell groups are arranged according to an ascending order of indexes of serving cells.

In one embodiment, serving cells comprised in any of the X cell groups are arranged according to a descending order of indexes of serving cells.

In one embodiment, any serving cell comprised in any of the X cell groups corresponds to a carrier.

In one embodiment, any serving cell comprised in any of the X cell groups corresponds to all or part of a carrier.

In one embodiment, there exist two of the X cell groups comprising a same serving cell.

In one embodiment, serving cells comprised in any two of the X cell groups are different.

In one embodiment, there exist two of the X cell groups comprising a completely same serving cell.

In one embodiment, there exist serving cells comprised in two of the X cell groups being not completely the same.

In one embodiment, the expression that "the X bit subsets are respectively for X cell groups" in the claim comprises the following meaning: the X bit subsets are respectively used to indicate HARQ-ACKs for the X cell groups.

In one embodiment, the expression that "the X bit subsets are respectively for X cell groups" in the claim comprises the following meaning: the X bit subsets are respectively associated with the X cell groups.

In one embodiment, the expression that "the X bit subsets are respectively for X cell groups" in the claim comprises the following meaning: the X bit subsets respectively correspond to the X cell groups.

In one embodiment, the expression that "the X bit subsets are respectively for X cell groups" in the claim comprises the following meaning: the X bit subsets are respectively used to indicate HARQ-ACKs of downlink transmissions in the X cell groups.

In one embodiment, the expression that "the X bit subsets are respectively for X cell groups" in the claim comprises the following meaning: the X bit subsets are respectively used to indicate HARQ-ACKs of potential downlink transmissions in the X cell groups.

In one embodiment, the expression that "the X bit subsets are respectively for X cell groups" in the claim comprises the following meaning: the X bit subsets are respectively used to indicate HARQ-ACKs of Physical Downlink Shared Channels (PDSCHs) in the X cell groups.

In one embodiment, the expression that "the X bit subsets are respectively for X cell groups" in the claim comprises the following meaning: the X bit subsets are respectively used to indicate HARQ-ACKs of PDSCHs (comprising PDSCHs for actual transmission and virtual transmission) in the X cell groups.

In one embodiment, the expression that "the X bit subsets are respectively for X cell groups" in the claim comprises the following meaning: the X bit subsets are respectively used to indicate HARQ-ACKs of candidate PDSCH occasions in the X cell groups.

In one embodiment, the expression that "the X bit subsets are respectively for X cell groups" in the claim comprises the following meaning: the X bit subsets are respectively used for the X cell groups.

In one embodiment, the first serving cell is a Pcell.

In one embodiment, the first serving cell is an Scell.

In one embodiment, the first serving cell is an SPcell.

In one embodiment, the first serving cell belongs to a Master Cell Group (MCG).

In one embodiment, the first serving cell belongs to a Secondary Cell Group (SCG).

In one embodiment, the first serving cell only belongs to one of the X cell groups.

In one embodiment, the first serving cell belongs to multiple cell groups in the X cell groups at the same time.

In one embodiment, the first serving cell belongs to all cell groups in the X cell groups at the same time.

In one embodiment, the first serving cell is self-scheduled.

In one embodiment, the first serving cell is cross-carrier scheduled.

In one embodiment, the expression that "the first control channel candidate is used for a first serving cell" in the claim comprises the following meaning: the first control channel candidate is used to schedule the first serving cell.

In one embodiment, the expression that "the first control channel candidate is used for a first serving cell" in the claim comprises the following meaning: a DCI carried by the first control channel candidate is used to schedule the first serving cell.

In one embodiment, the expression that "the first control channel candidate is used for a first serving cell" in the claim comprises the following meaning: the first node in the present application assumes that the first control channel candidate is used for the first serving cell.

In one embodiment, the expression that "the first control channel candidate is used for a first serving cell" in the claim comprises the following meaning: the first control channel candidate is used to schedule a channel or a signal transmitted on the first serving cell.

In one embodiment, the expression that "the first control channel candidate is used for a first serving cell" in the claim comprises the following meaning: a control resource set associated with the first search space set belongs to the first serving cell.

In one embodiment, the expression that "the first control channel candidate is used for a first serving cell" in the claim comprises the following meaning: a control resource set associated with the first search space set belongs to a Bandwidth Part (BWP) comprised in the first serving cell.

In one embodiment, the expression that "the first control channel candidate is used for a first serving cell" in the claim comprises the following meaning: a serving cell to which a control resource set associated with the first search space set belongs is a scheduling cell of the first serving cell.

In one embodiment, the expression that "the first control channel candidate is used for a first serving cell" in the claim comprises the following meaning: the first serving cell is a scheduling cell of a serving cell to which a control resource set associated with the first search space set belongs.

In one embodiment, the expression that "the first control channel candidate is used for a first serving cell" in the claim comprises the following meaning: frequency-domain resources occupied by the first control channel candidate belong to the first serving cell.

In one embodiment, the expression that "the first control channel candidate is used for a first serving cell" in the claim comprises the following meaning: frequency-domain resources occupied by the first control channel candidate belongs to a scheduling cell of the first serving cell.

In one embodiment, the first identity is an RNTI.

In one embodiment, the first identity is a Cell-Radio Network Temporary Identity (C-RNTI).

In one embodiment, the first identity is a Configured Scheduling-Radio Network Temporary Identity (CS-RNTI).

In one embodiment, the first identity is a Group-Radio Network Temporary Identity (G-RNTI).

In one embodiment, the first identity is a Multicast (and Broadcast Services)-Radio Network Temporary Identity (M-RNTI).

In one embodiment, the first identity is a Single Cell-Radio Network Temporary Identity (SC-RNTI).

In one embodiment, the first identity is a Single Cell-Notification-Radio Network Temporary Identity (SC-N-RNTI).

In one embodiment, the first identity is one of a C-RNTI, a CS-RNTI, a G-RNTI, an M-RNTI, an SC-RNTI and an SC-N-RNTI.

In one embodiment, the first identity is one of a C-RNTI and a G-RNTI.

In one embodiment, the first identity is an index value.

In one embodiment, the first identity is a non-negative integer.

In one embodiment, the first identity is a positive integer.

In one embodiment, the first identity is an integer.

In one embodiment, the first identity is an integer represented in decimal.

In one embodiment, the first identity is an integer represented in hexadecimal.

In one embodiment, the expression that "the first control channel candidate is used to determine a first identity" in the claim comprises the following meaning: the first control channel candidate carries the first identity.

In one embodiment, the expression that "the first control channel candidate is used to determine a first identity" in the claim comprises the following meaning: the first identity is used for scrambling sequence of a PDCCH occupying the first control channel candidate.

In one embodiment, the expression that "the first control channel candidate is used to determine a first identity" in the claim comprises the following meaning: the first identity is used for a scrambling sequence of an output bit after a DCI carried by the first control channel candidate is through channel coding.

In one embodiment, the expression that "the first control channel candidate is used to determine a first identity" in the claim comprises the following meaning: the first identity is used to initialize a scrambling sequence generator of an output bit after a DCI carried by the first control channel candidate is through channel coding.

In one embodiment, the expression that "the first control channel candidate is used to determine a first identity" in the claim comprises the following meaning: the first identity is used for a scrambling sequence of a CRC bit of a DCI carried by the first control channel candidate.

In one embodiment, the expression that "the first control channel candidate is used to determine a first identity" in the claim comprises the following meaning: a CRC bit of a DCI carried by the first control channel candidate carries the first identity.

In one embodiment, the expression that "the first control channel candidate is used to determine a first identity" in the claim comprises the following meaning: a channel or a signal scheduled by a DCI carried by the first control channel candidate carries the first identity.

In one embodiment, the expression that "the first control channel candidate is used to determine a first identity" in the claim comprises the following meaning: the first identity is used to generate a scrambling sequence of a channel or a signal scheduled by a DCI carried by the first control channel candidate.

In one embodiment, the expression that "the first control channel candidate is used to determine a first identity" in the claim comprises the following meaning: the first identity is used to initialize a scrambling sequence generator of a channel or a signal scheduled by a DCI carried by the first control channel candidate.

In one embodiment, the expression that "the first control channel candidate is used to determine a first identity" in the claim is implemented through claim 7 in the present application.

In one embodiment, the expression that "the first control channel candidate is used to determine a first identity" in the claim comprises the following meaning: the first control channel candidate is used by the first node in the present application to determine the first identity.

In one embodiment, the expression that "the first control channel candidate is used to determine a first identity" in the claim comprises the following meaning: the first control channel candidate is used to explicitly indicate the first identity.

In one embodiment, the expression that "the first control channel candidate is used to determine a first identity" in the claim comprises the following meaning: the first control channel candidate is used to implicitly indicate the first identity.

In one embodiment, the expression that "at least one of the first search space set or the first identity is used to determine a cell group to which the first serving cell belongs from the X cell groups" in the claim comprises the following meaning: at least one of the first search space set or the first identity is used by the first node in the present application to determine a cell group to which the first serving cell belongs from the X cell groups.

In one embodiment, the expression that "at least one of the first search space set or the first identity is used to determine a cell group to which the first serving cell belongs from the X cell groups" in the claim comprises the following meaning: both the first search space set and the first identity are used to determine a cell group to which the first serving cell belongs from the X cell groups.

In one embodiment, the expression that "at least one of the first search space set or the first identity is used to determine a cell group to which the first serving cell belongs from the X cell groups" in the claim comprises the following meaning: the first search space set is used to determine a cell group to which the first serving cell belongs from the X cell groups.

In one embodiment, the expression that "at least one of the first search space set or the first identity is used to determine a cell group to which the first serving cell belongs from the X cell groups" in the claim comprises the following meaning: the first identity is used to determine a cell group to which the first serving cell belongs from the X cell groups.

In one embodiment, the expression that "at least one of the first search space set or the first identity is used to determine a cell group to which the first serving cell belongs from the X cell groups" in the claim comprises the following meaning: the X cell groups are sequentially indexed, and at least one of the first search space set or the first identity is used to determine an index of at least a cell group to which the first serving cell belongs.

In one embodiment, a type of the first search space set is used to determine a cell group to which the first serving cell belongs from the X cell groups.

In one embodiment, an index or identity of the first search space set is used to determine a cell group to which the first serving cell belongs from the X cell groups.

In one embodiment, a DCI format monitored in the first search space set is used to determine a cell group to which the first serving cell belongs from the X cell groups.

In one embodiment, a DCI format adopted to monitor a control channel candidate comprised in the first search space set is used to determine a cell group to which the first serving cell belongs from the X cell groups.

In one embodiment, whether the first search space set is used to schedule groupcast or multicast traffic is used to determine a cell group to which the first serving cell belongs from the X cell groups.

In one embodiment, whether a DCI format adopted to monitor a control channel candidate comprised in the first search space set comprises a DCI format scheduling groupcast or multicast traffic is used to determine at least a cell group to which the first serving cell belongs from the X cell groups.

In one embodiment, whether an RNTI adopted to monitor a control channel candidate comprised in the first search space set comprises an RNTI of groupcast or multicast traffic is used to determine a cell group to which the first serving cell belongs from the X cell groups.

In one embodiment, the first search space set is used to determine a cell group to which the first serving cell belongs from the X cell groups according to a condition relation.

In one embodiment, a target cell group is one of the X cell groups, and the first search space set is used to determine whether the first serving cell belongs to the target cell.

In one embodiment, a target cell group is one of the X cell groups, and whether the first search space set is used for groupcast or multicast traffic is used to determine whether the first serving cell belongs to the target cell.

In one embodiment, a target cell group is one of the X cell groups, whether an RNTI (or a DCI format) adopted to monitor a control channel candidate comprised in the first search space set comprises an RNTI (or a DCI format) of groupcast or multicast traffic being used for groupcast or multicast traffic is used to determine whether the first serving cell belongs to the target cell.

In one embodiment, a type of the first identity is used to determine a cell group to which the first serving cell belongs from the X cell groups.

In one embodiment, the first identity is an RNTI, an RNTI type to which the first identity belongs is used to determine a cell group to which the first serving cell belongs from the X cell groups.

In one embodiment, a range to which the first identity belongs is used to determine a cell group to which the first serving cell belongs from the X cell groups.

In one embodiment, the first identity belongs to one of Q1 candidate identity sets, Q1 being a positive integer greater than 1, and any of the Q1 candidate identity sets comprises a positive integer number of candidate identity(identities), and any candidate identity comprised in any of the Q1 candidate identity sets is an RNTI; a candidate identity set to which the first identity belongs is used to determine a cell group to which the first serving cell belongs from the X cell groups.

In one embodiment, whether the first identity is used for groupcast or multicast traffic is used to determine a cell group to which the first serving cell belongs from the X cell groups.

In one embodiment, a target cell group is one of the X cell groups, and whether the first identity is used for groupcast or multicast traffic is used to determine whether the first serving cell belongs to the target cell group.

In one embodiment, a target cell group is one of the X cell groups, and whether the first identity is equal to a specific identity is used to determine whether the first serving cell belongs to the target cell group. In one subsidiary embodiment of the above embodiment, the specific identity is one of a G-RNTI, an M-RNTI, an SC-RNTI and an SC-N-RNTI. In one subsidiary embodiment of the above embodiment, the specific identity is used for an RNTI of groupcast or broadcast traffic. In one subsidiary embodiment of the above embodiment, the specific identity is used for an identity of groupcast or broadcast traffic.

In one embodiment, a target cell group is one of the X cell groups, whether the first identity belongs to a target identity set is used to determine whether the first serving cell belongs to the target cell group, the target identity set comprises a positive integer number of identity(identities). In one subsidiary embodiment of the above embodiment, the target identity set is predefined. In one subsidiary embodiment of the above embodiment, the target identity set comprises an identity used for groupcast or broadcast traffic. In one subsidiary embodiment of the above embodiment, the target identity set is configurable. In one subsidiary embodiment of the above embodiment, the target identity set is fixed.

Embodiment 2

Figure 2:
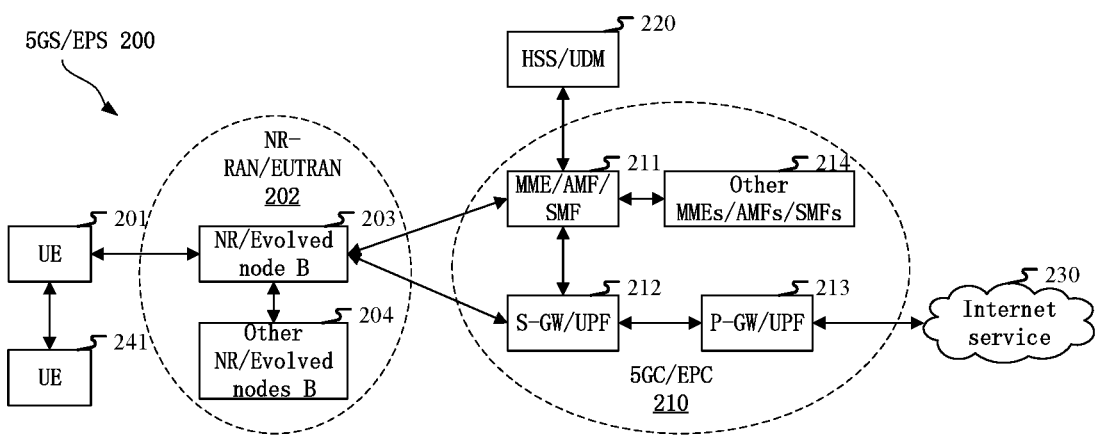
FIG. 2 illustrates a schematic diagram of a network architecture according to one embodiment of the present application.

Embodiment 2 illustrates a schematic diagram of a network architecture according to the present application, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/ Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/ Unified Data Management (UDM) 220 and an Internet Service 230. The 5GS/EPS 200 may be interconnected with other access networks. For simple description, the entities/ interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN comprises an NR/evolved node B (gNB/eNB) 203 and other gNBs (eNBs) 204. The gNB (eNB) 203 provides UE 201-oriented user plane and control plane protocol terminations. The gNB(eNB) 203 may be connected to other gNBs (eNBs) 204 via an Xn/X2 interface (e.g., backhaul). The gNB(eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB(eNB) 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, test devices, test instrumentation, test tools or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB (eNB) 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/ UPF 212, the S-GW/UPF 212 is connected to the P-GW/ UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 supports multi-groupcast or broadcast transmission.

In one embodiment, the gNB(eNB) 201 corresponds to the second node in the present application.

In one embodiment, the gNB(eNB) 201 supports groupcast or broadcast transmission.

Embodiment 3

Figure 3:
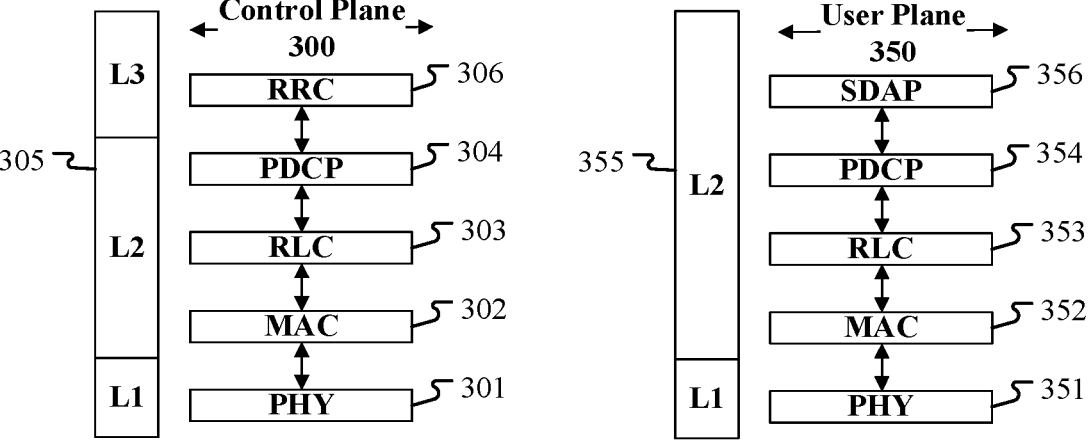
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE or gNB) and a second node (gNB or UE) is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the first node and the second node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information block in the present application is generated by the RRC 306, or the MAC 302, or the MAC 352, or the PHY 301, or the PHY 351.

In one embodiment, the first bit set in the present application is generated by the RRC 306, or the MAC 302, or the MAC 352, or the PHY 301, or the PHY 351.

In one embodiment, the second information block in the present application is generated by the RRC 306, or the MAC 302, or the MAC 352, or the PHY 301, or the PHY 351.

In one embodiment, the first signal in the present application is generated by the RRC 306, or the MAC 302, or the MAC 352, or the PHY 301, or the PHY 351.

Embodiment 4

Figure 4:
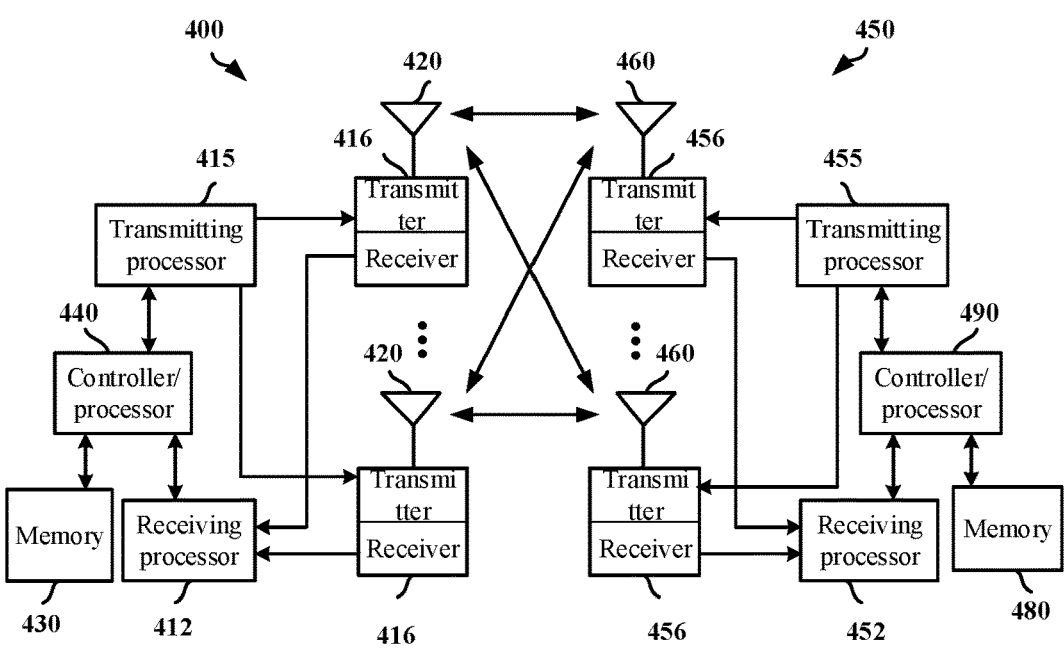
FIG. 4 illustrates a schematic diagram of a first node and a second node according to one embodiment of the present application.

Embodiment 4 illustrates a schematic diagram of a first node and a second node according to the present application, as shown in FIG. 4.

The first node (450) may comprise a controller/processor 490, a data source/buffer 480, a receiving processor 452, a transmitter/receiver 456 and a transmitting processor 455, wherein the transmitter/receiver 456 comprises an antenna 460.

The second node (410) may comprise a controller/processor 440, a data source/buffer 430, a receiving processor 412, a transmitter/receiver 416 and a transmitting processor 415, wherein the transmitter/receiver 416 comprises an antenna 420.

In downlink (DL), a higher-layer packet, such as high-layer information comprised in a first information block, a second information block, and a first signal in the present application, is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first node 450 based on varied priorities. The controller/processor 440 is also in charge of HARQ operation, retransmission of a lost packet, and a signaling to the first node 450, for instance, higher-layer information comprised in a first information block, a second information block and a first signal in the present application are all generated in the controller/processor 440. The transmitting processor 415 provides various signal-processing functions for the L1 layer (that is, PHY), including coding, interleaving, scrambling, modulating, power control/allocation, precoding and generation of physical-layer control signaling, such as generation of a physical-layer signal of a first signal, a physical-layer signal carrying a first information block and a physical-layer signal carrying a first information block in the present application is completed at the transmitter 415. The generated modulation symbols are divided into parallel streams and each stream is mapped onto a corresponding multicarrier subcarrier and/or a multicarrier symbol, which is later mapped from the transmitting processor 415 to the antenna 420 via the transmitter 416 in the form of a radio frequency signal. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving processing function comprises receptions of a physical-layer signal of a first signal, a physical-layer signal carrying a first information block and a physical-layer signal carrying a first information block in the present application. Multicarrier symbols in multicarrier symbol streams are demodulated based on varied modulation schemes (i.e., BPSCK, QPSK), and are then de-scrambled, decoded and de-interleaved to recover data or control signal transmitted by the second node 410 on a physical channel. And after that the data and control signal are provided to the controller/processor 490. The controller/processor 490 is in charge of the function of L2 layer and above layers, and the controller/processor 490 interprets higher layer information comprised in the first information block, the second information block and the first signal in the present application. The controller/processor can be connected to a memory 480 that stores program code and data. The memory 480 may be called a computer readable medium.

In uplink (UL) transmission, similar to downlink transmission, higher-layer information is provided to the transmission processor 455 to implement various signal transmission processing functions for L1 layer (i.e., the physical layer) after being generated by the controller/processor 490, the first bit set in the present application is generated by the transmitting processor 455, which is later mapped from the transmitting processor 455 to the antenna 460 via the transmitter 456 in the form of an RF signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 implements various signal reception and processing functions for the L1 layer (i.e., the physical layer), comprising receiving and processing the first bit set in the present application, and then providing data and/or control signals to the controller/processor 440. The controller/processor 440 performs functions of L2 layer, including interpreting higher-layer information. The controller/processor can be connected to a buffer 430 that stores program code and data. The buffer 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives a first information block, the first information block is used to determine a first search space set, the first search space set comprises a positive integer number of control channel candidate(s); monitors a first control channel candidate, the first control channel candidate is one of a positive integer number of control channel candidate(s) comprised in the first search space set; transmits a first bit set, the first bit set comprises X bit subsets, each of the X bit subsets comprises a positive integer number of HARQ-ACK bit(s), X being a positive integer greater than 1; herein, the X bit subsets are respectively for X cell groups, and any of the X cell groups comprises a positive integer number of serving cell(s); the first control channel candidate is used for a first serving cell, and the first serving cell belongs to one or multiple cell groups among the X cell groups; the first control channel candidate is used to determine a first identity, and at least one of the first search space set or the first identity is used to determine at least a cell group to which the first serving cell belongs from the X cell groups.

In one embodiment, the first node 450 comprises a memory that stores a computer readable instruction program. The computer readable instruction program generates an action when executed by at least one processor. The action includes: receiving a first information block, the first information block being used to determine a first search space set, the first search space set comprising a positive integer number of control channel candidate(s); monitoring a first control channel candidate, the first control channel candidate being one of a positive integer number of control channel candidate(s) comprised in the first search space set; transmitting a first bit set, the first bit set comprising X bit subsets, each of the X bit subsets comprising a positive integer number of HARQ-ACK bit(s), X being a positive integer greater than 1; herein, the X bit subsets are respectively for X cell groups, and any of the X cell groups comprises a positive integer number of serving cell(s); the first control channel candidate is used for a first serving cell, and the first serving cell belongs to one or multiple cell groups among the X cell groups; the first control channel candidate is used to determine a first identity, and at least one of the first search space set or the first identity is used to determine at least a cell group to which the first serving cell belongs from the X cell groups.

In one embodiment, the second node 410 comprises at least one processor and at least one memory. The at least one memory comprises computer program codes; the at least one memory and the computer program codes are configured to be used in collaboration with the at least one processor. The second node 410 at least: transmits a first information block, the first information block is used to indicate a first search space set, the first search space set comprises a positive integer number of control channel candidate(s); determines a first control channel candidate, the first control channel candidate is one of a positive integer number of control channel candidate(s) comprised in the first search space set; receives a first bit set, the first bit set comprises X bit subsets, each of the X bit subsets comprises a positive integer number of HARQ-ACK bit(s), X being a positive integer greater than 1; herein, the X bit subsets are respectively for X cell groups, and any of the X cell groups comprises a positive integer number of serving cell(s); the first control channel candidate is used for a first serving cell, and the first serving cell belongs to one or multiple cell groups among the X cell groups; the first control channel candidate is used to determine a first identity, and at least one of the first search space set or the first identity is used to determine at least a cell group to which the first serving cell belongs from the X cell groups.

In one embodiment, the second node 410 comprises a memory that stores a computer readable instruction program. The computer readable instruction program generates an action when executed by at least one processor. The action includes: transmitting a first information block, the first information block being used to indicate a first search space set, the first search space set comprising a positive integer number of control channel candidate(s); determining a first control channel candidate, the first control channel candidate being one of a positive integer number of control channel candidate(s) comprised in the first search space set; receiving a first bit set, the first bit set comprising X bit subsets, each of the X bit subsets comprising a positive integer number of HARQ-ACK bit(s), X being a positive integer greater than 1; herein, the X bit subsets are respectively for X cell groups, and any of the X cell groups comprises a positive integer number of serving cell(s); the first control channel candidate is used for a first serving cell, and the first serving cell belongs to one or multiple cell groups among the X cell groups; the first control channel candidate is used to determine a first identity, and at least one of the first search space set or the first identity is used to determine at least a cell group to which the first serving cell belongs from the X cell groups.

In one embodiment, the first node 450 is a UE.

In one embodiment, the first node 450 is a UE supporting groupcast or broadcast traffic.

In one embodiment, the second node 410 is a base station (gNB/eNB).

In one embodiment, the second node 410 is a base station supporting groupcast or broadcast traffic.

In one embodiment, the receiver 456 (including the antenna 460), the receiving processor 452 and the controller/processor 490 are used to receive the first information block in the present application.

In one embodiment, the receiver 456 (including the antenna 460) and the receiving processor 452 are used to monitor the first control channel candidate in the present application.

In one embodiment, the transmitter 456 (including the antenna 460), and the transmitting processor 455 are used to transmit the first bit set in the present application.

In one embodiment, the receiver 456 (including the antenna 460), the receiving processor 452 and the controller/processor 490 are used to receive the second information block in the present application.

In one embodiment, the receiver 456 (including the antenna 460), the receiving processor 452 and the controller/processor 490 are used to receive the first signal in the present application.

In one embodiment, the transmitter 416 (including the antenna 420), the transmitting processor 415 and the controller/processor 440 are used to transmit the first information block in the present application.

In one embodiment, the transmitter 416 (including the antenna 420) and the transmitting processor 415 are used to determine the first control channel candidate in the present application.

In one embodiment, the receiver 416 (including the antenna 420) and the receiving processor 412 are used to receive the first bit set in the present application.

In one embodiment, the transmitter 416 (including the antenna 420), the transmitting processor 415 and the controller/processor 440 are used to transmit the second information block in the present application.

In one embodiment, the transmitter 416 (including the antenna 420), the transmitting processor 415 and the controller/processor 440 are used to transmit the first signal in the present application.

Embodiment 5

Figure 5:
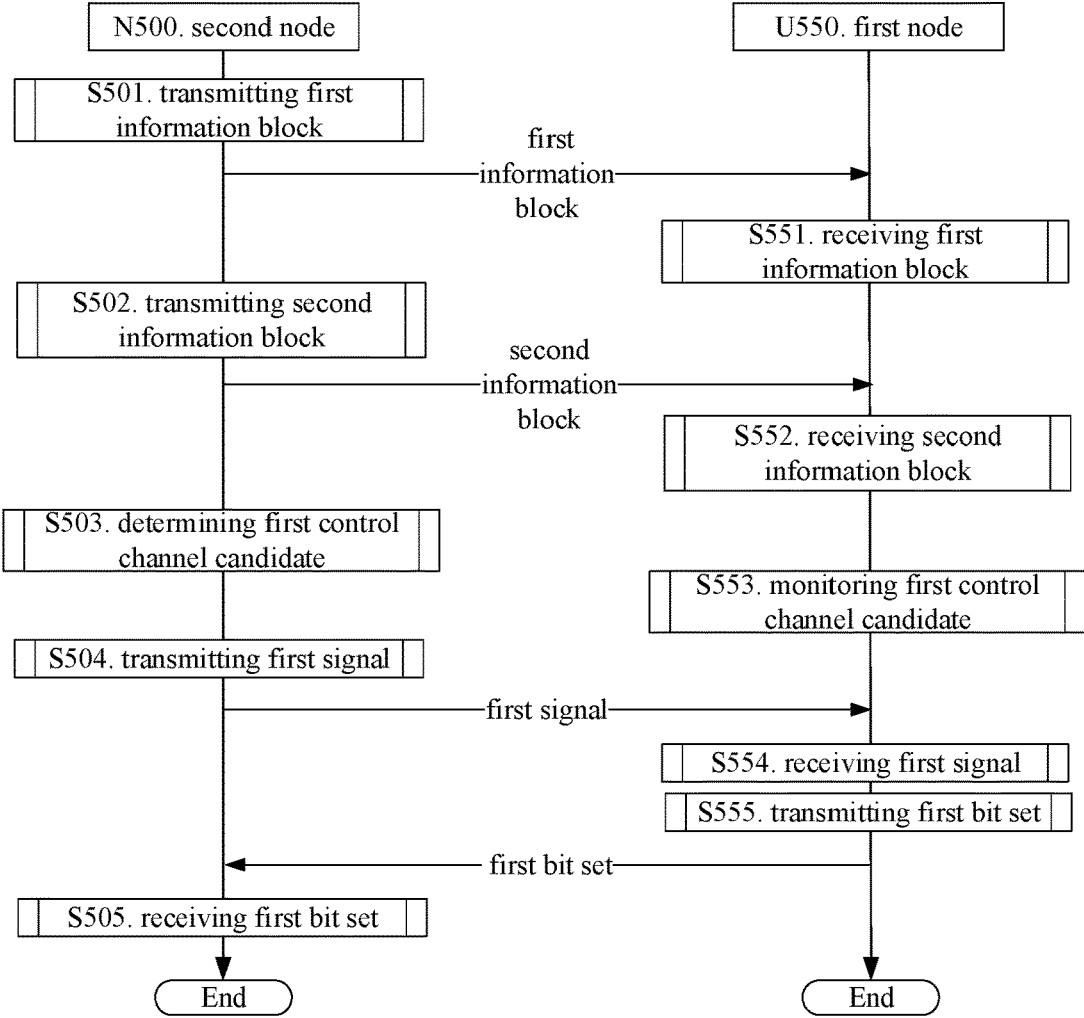
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a second node N500 is a maintenance base station of a serving cell of a first node U550. It is particularly underlined that the order illustrated in the embodiment does not put constraints over sequences of signal transmissions and implementations.

The second node N500 transmits a first information block in step S501, transmits a second information block in step S502, determines a first control channel candidate in step S503, transmits a first signal in step S504, and receives a first bit set in step S505.

The first node U550 receives a first information block in step S551, receives a second information block in step S552, monitors a first control channel candidate in step S553, receives a first signal in step S554, and transmits a first bit set in step S555.

In embodiment 5, the first information block is used to determine a first search space set, the first search space set comprises a positive integer number of control channel candidate(s); the first control channel candidate is one of a positive integer number of control channel candidate(s) comprised in the first search space set; the first bit set comprises X bit subsets, each of the X bit subsets comprises a positive integer number of HARQ-ACK bit(s), X being a positive integer greater than 1; the X bit subsets are respectively for X cell groups, and any of the X cell groups comprises a positive integer number of serving cell(s); the first control channel candidate is used for a first serving cell, and the first serving cell belongs to one or multiple cell groups among the X cell groups; the first control channel candidate is used to determine a first identity, and at least one of the first search space set or the first identity is used to determine at least a cell group to which the first serving cell belongs from the X cell groups; the second information block is used to determine a first time-domain resource set; information carried by the first control channel candidate is used to determine time-frequency resources occupied by the first signal.

In one embodiment, the second information block is transmitted through an air interface.

In one embodiment, the second information block is transmitted through a radio interface.

In one embodiment, a transmitter of the second information comprises the second node in the present application.

In one embodiment, the second information block comprises all or part of a higher-layer signaling.

In one embodiment, the second information block comprises all or part of a physical-layer signaling.

In one embodiment, the second information block comprises all or part of an RRC layer signaling.

In one embodiment, the second information block comprises all or part of a MAC layer signaling.

In one embodiment, the second information block comprises all or part of a System Information Block (SIB).

In one embodiment, the second information block is transmitted through a DL-SCH.

In one embodiment, the second information block is transmitted through a PDSCH.

In one embodiment, the second information block is transmitted through a Physical Broadcast Channel (PBCH).

In one embodiment, the second information block is Cell-Specific.

In one embodiment, the second information block is UE-specific.

In one embodiment, the second information block is Per Serving Cell configured.

In one embodiment, the second information block comprises all or partial fields of a DCI signaling.

In one embodiment, the second information block comprises all or partial fields in an IE "BWP-Downlink" in an RRC signaling.

In one embodiment, the second information block comprises all or partial fields in an IE "BWP-DownlinkDedicated" in an RRC signaling.

In one embodiment, the second information block comprises all or partial fields in an IE "PDSCH-Config" in an RRC signaling.

In one embodiment, the second information block comprises all or partial fields in an IE "PDSCH-ConfigPTM" in an RRC signaling.

In one embodiment, the second information block comprises all or partial fields in an IE "PDSCH-ConfigCommon" in an RRC signaling.

In one embodiment, the second information block comprises a field "pdsch-TimeDomainAllocationList" in an RRC signaling.

In one embodiment, the second information block comprises a field "pdsch-TimeDomainAllocationListForPTM" in an RRC signaling.

In one embodiment, the second information block comprises a field "pdsch-TimeDomainAllocationListDCI-2-x1-r17" in an RRC signaling, where x1 is a positive integer greater than 6.

In one embodiment, the second information block comprises all or partial fields in an Information Element (IE) "PDSCH-TimeDomainResourceAllocationList" in an RRC signaling.

In one embodiment, the second information block comprises all or partial fields in an IE "dl-DataToUL-ACK" in an RRC signaling.

In one embodiment, the second information block comprises all or partial fields in an IE "PUCCH-Config" in an RRC signaling.

In one embodiment, the second information block comprises all or partial fields in an IE "dl-DataToUL-ACK-ForDCIFormat1_2" in an RRC signaling.

In one embodiment, the second information block comprises all or partial fields in an IE "dl-DataToUL-ACK" and an IE "dl-DataToUL-ACK-ForDCIFormat1_2" in an RRC signaling.

In one embodiment, the second information block comprises all or partial fields in an IE "dl-DataToUL-ACK-PTM" in an RRC signaling.

In one embodiment, the second information block comprises all or partial fields in an IE "dl-DataToUL-ACK-ForDCIFormat2_x1" in an RRC signaling, where x1 is a positive integer greater than 6.

In one embodiment, the first information block and the second information block respectively belong to two different IEs in a same RRC signaling.

In one embodiment, the first information block and the second information block respectively belong to two different fields in a same IE in a same RRC signaling.

In one embodiment, the first information block and the second information block respectively belong to two different RRC signalings.

In one embodiment, the expression that "the second information block is used to determine a first time-domain resource set" in the claim comprises the following meaning: the second information block is used by the first node in the present application to determine the first time-domain resource set.

In one embodiment, the expression that "the second information block is used to determine a first time-domain resource set" in the claim comprises the following meaning: the second information block is used to indicate a Start and Length Indicator Value (SLIV), and the SLIV indicated by the second information block is used to determine the first time-domain resource set.

In one embodiment, the expression that "the second information block is used to determine a first time-domain resource set" in the claim comprises the following meaning: the second information block is used to indicate a time offset between downlink data and an uplink ACK/NACK, and the time offset between the downlink data and the uplink ACK/NACK indicated by the second information block is used to determine the first time-domain resource set.

In one embodiment, the expression that "the second information block is used to determine a first time-domain resource set" in the claim comprises the following meaning: the second information block is used to indicate a slot timing offset set K1, and the slot timing offset set K1 is used to determine the first time-domain resource set.

In one embodiment, the expression that "the second information block is used to determine a first time-domain resource set" in the claim comprises the following meaning: the second information block is used to explicitly indicate the first time-domain resource set.

In one embodiment, the expression that "the second information block is used to determine a first time-domain resource set" in the claim comprises the following meaning: the second information block is used to implicitly indicate the first time-domain resource set.

In one embodiment, the expression that "the second information block is used to determine a first time-domain resource set" in the claim comprises the following meaning: the second information block indicates a time interval length between each time-domain resource block comprised in the first time-domain resource set and the first bit set.

In one embodiment, the expression that "the second information block is used to determine a first time-domain resource set" in the claim comprises the following meaning: the second information indicates a time interval length between each time-domain resource block comprised in the first time-domain resource set and a signal or a channel carrying the first bit set; the second information block indicates a number of time-domain symbol(s) and/or slot(s) comprised in each time-domain resource block comprised in the first time-domain resource set.

In one embodiment, the expression that "the second information block is used to determine a first time-domain resource set" in the claim comprises the following meaning: the second information block indicates a number of slot(s) and symbol(s) in a time-domain interval between each time-domain resource block comprised in the first time-domain resource set indicated by the second information block and a signal or a channel carrying the first bit set; the second information block indicates a number of time-domain symbol(s) and/or slot(s) comprised in each time-domain resource block comprised in the first time-domain resource set.

In one embodiment, the expression that "the second information block is used to determine a first time-domain resource set" in the claim comprises the following meaning: the second information block indicates a number of slot(s) and symbol(s) in a time-domain interval between an end time of each time-domain resource block comprised in the first time-domain resource set indicated by the second information block and a start time of a signal or channel carrying the first bit set; the second information block indicates a number of time-domain symbol(s) and/or slot(s) comprised in each time-domain resource block comprised in the first time-domain resource set. In one subsidiary embodiment of the above embodiment, the symbol and the slot adopts a subcarrier spacing (SCS) of a subcarrier comprised in a signal or channel carrying the first bit set. In one subsidiary embodiment of the above embodiment, the symbol and the slot adopts an SCS of a subcarrier comprised in a PDSCH corresponding to the first bit set.

Embodiment 6

Figure 6:
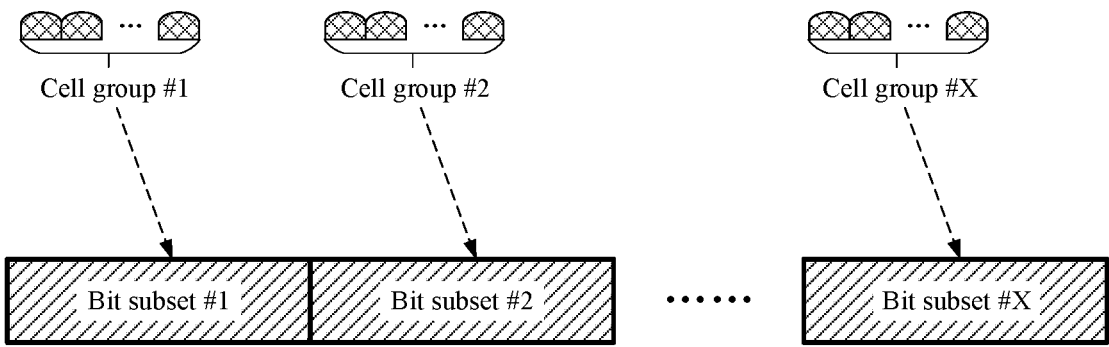
FIG. 6 illustrates a schematic diagram of X bit subsets according to one embodiment of the present application.

Embodiment 6 illustrates a schematic diagram of X bit subsets according to one embodiment of the present application, as shown in FIG. 6. In FIG. 6, each slash-filled rectangle represents a bit subset in X bit subset, and cross-line-filled figure with an arc top represents a serving cell comprised in one of X cell groups.

In embodiment 6, the X cell groups in the present application are sequentially indexed, and at least one of the first search space set in or the first identity in the present application is used to determine an index of a cell group to which the first serving cell in the present application belongs; the X bit subsets in the present application are concatenated to generate the first bit set in the present application, and an order of indexes of the X cell groups is used to determine a concatenation order of the X bit subsets.

In one embodiment, the X cell groups are sequentially and continuously indexed.

In one embodiment, the X cell groups are sequentially and discontinuously indexed.

In one embodiment, the X cell groups are successively indexed starting from 0.

In one embodiment, an index of any of the X cell groups is a positive integer.

In one embodiment, an index of any of the X cell groups is a non-negative positive integer.

In one embodiment, an index of any of the X cell groups is an identity of the cell group.

In one embodiment, the X cell groups are sequentially indexed according to a condition relation.

In one embodiment, the X cell groups are sequentially indexed according to magnitude relation of index values of comprised serving cells.

In one embodiment, the expression that "at least one of the first search space set or the first identity is used to determine an index of a cell group to which the first serving cell belongs" in the claim comprises the following meaning: at least one of the first search space set or the first identity is used by the first node in the present application to determine an index of a cell group to which the first serving cell belongs.

In one embodiment, the expression that "at least one of the first search space set or the first identity is used to determine an index of a cell group to which the first serving cell belongs" in the claim comprises the following meaning: at least one of the first search space set or the first identity is used to determine an index of a cell group to which the first serving cell belongs from indexes of the X cell groups.

In one embodiment, the expression that "at least one of the first search space set or the first identity is used to determine an index of a cell group to which the first serving cell belongs" in the claim comprises the following meaning: both the first search space set and the first identity are used to determine an index of a cell group to which the first serving cell belongs.

In one embodiment, the expression that "at least one of the first search space set or the first identity is used to determine an index of a cell group to which the first serving cell belongs" in the claim comprises the following meaning: the first search space set is used to determine an index of a cell group to which the first serving cell belongs.

In one embodiment, the expression that "at least one of the first search space set or the first identity is used to determine an index of a cell group to which the first serving cell belongs" in the claim comprises the following meaning: the first identity is used to determine an index of a cell group to which the first serving cell belongs.

In one embodiment, a type of the first search space set is used to determine an index of a cell group to which the first serving cell belongs.

In one embodiment, an index or identity of the first search space set is used to determine an index of a cell group to which the first serving cell belongs.

In one embodiment, a DCI format adopted to monitor a control channel candidate comprised in the first search space set is used to determine an index of a cell group to which the first serving cell belongs.

In one embodiment, a target index is equal to an index of one of the X cell groups, and whether the first search space set is used to schedule groupcast or multicast traffic is used to determine whether an index of a cell group to which the first serving cell belongs is equal to the target index.

In one embodiment, a target index is equal to an index of one of the X cell groups, and whether a DCI format adopted to monitor a control channel candidate comprised in the first search space set comprises a DCI format scheduling groupcast or multicast traffic is used to determine whether an index of a cell group to which the first serving cell belongs is equal to the target index.

In one embodiment, a target index is equal to an index of one of the X cell groups, and whether an RNTI adopted to monitor a control channel candidate comprised in the first search space set comprises an RNTI of groupcast or multicast traffic is used to determine whether an index of a cell group to which the first serving cell belongs is equal to the target index.

In one embodiment, the first search space set is used to determine an index of a cell group to which the first serving cell belongs according to condition relation.

In one embodiment, a type of the first identity is used to determine an index of a cell group to which the first serving cell belongs.

In one embodiment, the first identity is an RNTI, an RNTI type to which the first identity belongs is used to determine an index of a cell group to which the first serving cell belongs.

In one embodiment, a range to which the first identity belongs is used to determine an index of a cell group to which the first serving cell belongs.

In one embodiment, a target index is equal to an index of one of the X cell groups, and whether the first identity is used for groupcast or multicast traffic is used to determine whether an index of a cell group to which the first serving cell belongs is equal to the target index.

In one embodiment, a target index is equal to an index of one of the X cell groups, and whether the first identity is used for groupcast or multicast traffic is used to determine whether an index of a cell group to which the first serving cell belongs is equal to the target index.

In one embodiment, a target index is equal to an index of one of the X cell groups, and whether the first identity is equal to a specific identity is used to determine whether an index of a cell group to which the first serving cell belongs is equal to the target index. In one subsidiary embodiment of the above embodiment, the specific identity is one of a G-RNTI, an M-RNTI, an SC-RNTI and an SC-N-RNTI. In one subsidiary embodiment of the above embodiment, the specific identity is used for an RNTI of groupcast or broadcast traffic. In one subsidiary embodiment of the above embodiment, the specific identity is used for an identity of groupcast or broadcast traffic.

In one embodiment, a target index is equal to an index of one of the X cell groups, whether the first identity belongs to a target identity set is used to determine whether an index of a cell group to which the first serving cell belongs is equal to the target index, and the target identity set comprises a positive integer number of identity(identities). In one subsidiary embodiment of the above embodiment, the target identity set is predefined. In one subsidiary embodiment of the above embodiment, the target identity set comprises an identity used for groupcast or broadcast traffic. In one subsidiary embodiment of the above embodiment, the target identity set is configurable. In one subsidiary embodiment of the above embodiment, the target identity set is fixed.

In one embodiment, bits in the X bit subset are sequentially concatenated to obtain the first bit set.

In one embodiment, bits comprised in any of the X bit subsets are sequentially indexed, and bits comprised in any of the X bit subsets are sequentially arranged in the first bit set according to a concatenation order of the X bit subsets.

In one embodiment, bits comprised in any of the X bit subset are sequentially arranged, and bits comprised in two adjacent bit subsets among the X bit subsets are arranged end-to-end to generate the first bit set.

In one embodiment, bits in the X bit subsets are sequentially arranged to obtain the first bit set according to a concatenation order of the X bit subsets.

In one embodiment, the expression that "an order of indexes of the X cell groups is used to determine a concatenation order of the X bit subsets" in the claim comprises the following meaning: a sequence of indexes of the X cell groups is used by the first node in the present application to determine a concatenation order of the X bit subsets.

In one embodiment, the expression that "an order of indexes of the X cell groups is used to determine a concatenation order of the X bit subsets" in the claim comprises the following meaning: the X bit subsets are concatenated according to an ascending order of indexes of corresponding cell groups in the X cell groups.

In one embodiment, the expression that "an order of indexes of the X cell groups is used to determine a concatenation order of the X bit subsets" in the claim comprises the following meaning: the X bit subsets are concatenated according to a descending order of indexes of corresponding cell groups in the X cell groups.

In one embodiment, the expression that "an order of indexes of the X cell groups is used to determine a concatenation order of the X bit subsets" in the claim comprises the following meaning: the X bit subsets are concatenated according to an ascending order of indexes of corresponding cell groups in the X cell groups.

In one embodiment, the expression that "an order of indexes of the X cell groups is used to determine a concatenation order of the X bit subsets" in the claim comprises the following meaning: the X bit subsets are concatenated according to an ascending order of indexes of corresponding cell groups in the X cell groups.

In one embodiment, the expression that "an order of indexes of the X cell groups is used to determine a concatenation order of the X bit subsets" in the claim comprises the following meaning: order of any of the X bit subsets during concatenation is the same as an index order of corresponding cell groups in the X cell groups.

In one embodiment, the expression that "an order of indexes of the X cell groups is used to determine a concatenation order of the X bit subsets" in the claim comprises the following meaning: an order of an index of any of the X cell groups in the X cell groups is used to determine a position of a corresponding bit subset in the X bit subsets in the first bit set.

Embodiment 7

Figure 7:
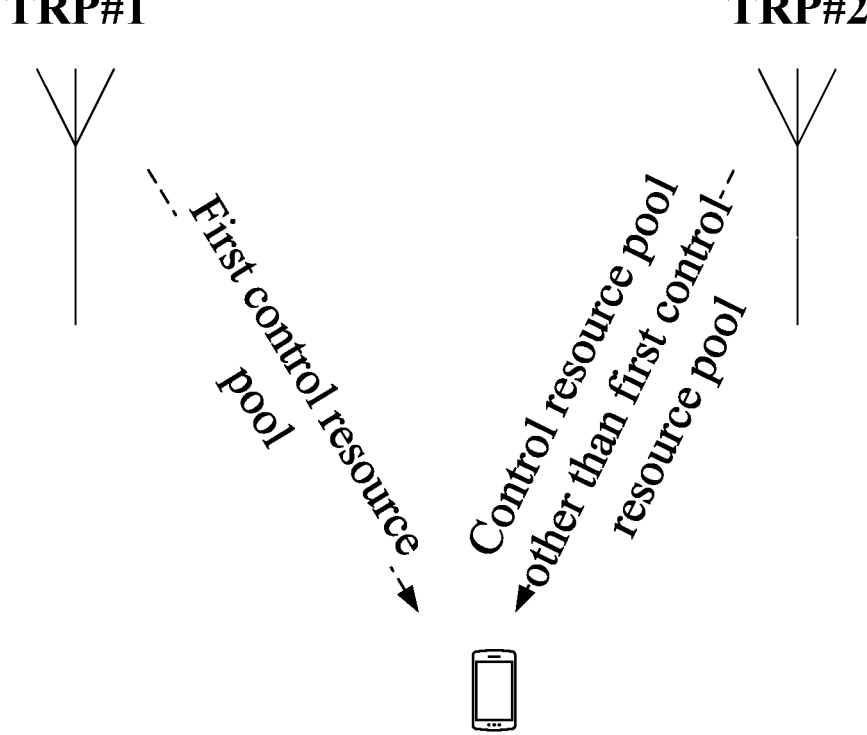
FIG. 7 illustrates a schematic diagram of a first control resource pool according to one embodiment of the present application.

Embodiment 7 illustrates a schematic diagram of a first control resource pool according to one embodiment of the present application, as shown in FIG. 7. In FIG. 7, a first control resource pool and a control resource pool other than a first control resource pool are respectively transmitted from TRP #1 and TRP #2.

In embodiment 7, the first search space set in the present application is associated with a first control resource set, the first control resource set belongs to a first control resource pool, and an index of the first control resource pool is used to determine a cell group to which the first serving cell in the present application belongs from the X cell groups in the present application.

In one embodiment, the first information block is used to determine that the first search space set and the first control resource set are associated.

In one embodiment, the first receiver in the present application receives a third information block, and the third information block is used to determine that the first search space set and the first control resource set are associated.

In one embodiment, a CCE occupied by any control channel candidate comprised in the first search space set belongs to the first control resource set.

In one embodiment, an index of the first search space set and an index of the first control resource set are associated.

In one embodiment, a REG occupied by any control channel candidate comprised in the first search space set belongs to the first control resource set.

In one embodiment, the first control resource set is used to determine a mapping between a CCE occupied by any control channel candidate comprised in the first search space set and an occupied REG.

In one embodiment, the first control resource set is used to determine a Quasi co-location of any control channel candidate comprised in the first search space set.

In one embodiment, the first control resource set comprises more than one CCE.

In one embodiment, the first control resource set is a Control Resource Set (CORESET).

In one embodiment, the first control resource set comprises more than one CCE, and any two CCEs comprised in the first control resource set belong to a same CORESET.

In one embodiment, the first control resource set comprises more than one Resource Element Group (REG).

In one embodiment, the first control resource set is allocated a CORESET index.

In one embodiment, the first information block is used to determine the first control resource set.

In one embodiment, two different fields in the first information block are respectively used to determine the first Search Space Set and the first control resource set.

In one embodiment, the first control resource pool comprises a positive integer number of CORESET(s).

In one embodiment, the first control resource pool comprises more than one CORESET.

In one embodiment, the first information block is used to determine an index of a control resource pool to which the first control resource set belongs.

In one embodiment, the first control resource pool is a CORESET pool.

In one embodiment, the first control resource pool belongs to H candidate control resource pools, H being a positive integer greater than 1; indexes of any two of the H candidate control resource pools are unequal. In one subsidiary embodiment of the above embodiment, H is equal to 2. In one subsidiary example of the above embodiment, QCLs of any two of the H candidate control resource pools are different. In one subsidiary embodiment of the above embodiment, H is equal to 2, and indexes of the H candidate control resource pools are respectively "0" and "1". In one subsidiary embodiment of the above embodiment, any two of the H candidate control resource pools belong to different Transmit Receive Points (TRPs). In one subsidiary embodiment of the above embodiment, any two of the H candidate control resource pools belong to different panels. In one subsidiary embodiment of the above embodiment, initial values of scrambling sequences of control channel candidates comprised in any two of the H candidate control resource pools are unequal. In one subsidiary embodiment of the above embodiment, the H candidate control resource pools are predefined or configurable.

In one embodiment, an index of the first control resource pool is a non-negative integer.

In one embodiment, an index of the first control resource pool is a positive integer.

In one embodiment, an index of the first control resource pool is equal to one of 0 or 1.

In one embodiment, an index of the first control resource pool is related to QCL of the first control resource pool.

In one embodiment, an index of the first control resource pool is related to a TRP corresponding to the first control resource pool.

In one embodiment, an index of the first control resource pool is related to a panel corresponding to the first control resource pool.

In one embodiment, the expression that "an index of the first control resource pool is used to determine a cell group to which the first serving cell belongs from the X cell groups" in the claim comprises the following meaning: an index of the first control resource pool is used by the first node in the present application to determine a cell group to which the first serving cell belongs from the X cell groups.

In one embodiment, the expression that "an index of the first control resource pool is used to determine a cell group to which the first serving cell belongs from the X cell groups" in the claim comprises the following meaning: an index of the first control resource pool is used to determine a cell group to which the first serving cell belongs from the X cell groups according to a condition relation.

In one embodiment, the expression that "an index of the first control resource pool is used to determine a cell group to which the first serving cell belongs from the X cell groups" in the claim comprises the following meaning: an index of the first control resource pool is equal to one of 0 or 1; when an index of the first control resource pool is equal to 0, the first serving cell belongs to a first cell group; when an index of the first control resource pool is equal to 1, the first serving cell belongs to a second cell group; the first cell group and the second cell group are respectively two different cell groups in the X cell groups.

In one embodiment, the expression that "an index of the first control resource pool is used to determine a cell group to which the first serving cell belongs from the X cell groups" in the claim comprises the following meaning: an index of the first control resource pool is equal to one of 0 or 1; when an index of the first control resource pool is equal to 0 and the first search space set is a search space set other than a target type, the first serving cell belongs to a first cell group; when an index of the first control resource pool is equal to 1 and the first search space set is a search space set other than the target type, the first serving cell belongs to a second cell group; when the first search space set is a search space set of the target type, the first serving cell belongs to a third cell group; the first cell group is one of X cell groups, the second cell group is one of the X cell groups, and the third cell group is one of the X cell groups. In one subsidiary embodiment of the above embodiment, the target type is a search space set type used for groupcast or broadcast traffic. In one subsidiary embodiment of the above embodiment, the target type is a Common Search Space (CSS) set type other than Type0, Type0A, Type1, Type2, Type3. In one subsidiary embodiment of the above embodiment, the target type is Type 4 of a CSS set. In one subsidiary embodiment of the above embodiment, the target type is a search space set type supporting a specific DCI format. In one subsidiary embodiment of the above embodiment, the target type is a CSS set. In one subsidiary embodiment of the above embodiment, the target type is a UE-Specific Search Space set. In one subsidiary embodiment of the above embodiment, the target type is a search space set type supporting a DCI format used for groupcast or broadcast traffic. In one subsidiary embodiment of the above embodiment, the target type is a given range of an index of a search space set.

In one embodiment, the expression that "an index of the first control resource pool is used to determine a cell group to which the first serving cell belongs from the X cell groups" in the claim comprises the following meaning: an index of the first control resource pool is equal to one of 0 or 1; when an index of the first control resource pool is equal to 0 and a DCI format supported by the first search space set does not comprise a target DCI format, the first serving cell belongs to a first cell group; when an index of the first control resource pool is equal to 1 and a DCI format supported by the first search space set does not comprise the target DCI format, the first serving cell belongs to a second cell group; when a DCI format supported by the first search space set comprises the target DCI format, the first serving cell belongs to a third cell group; the first cell group is one of the X cell groups, the second cell group is one of the X cell groups, and the third cell group is one of the X cell groups. In one subsidiary embodiment of the above embodiment, the target DCI format is used for groupcast or broadcast traffic. In one subsidiary embodiment of the above embodiment, the target DCI format is DCI format 2_7.

In one embodiment, the expression that "an index of the first control resource pool is used to determine a cell group to which the first serving cell belongs from the X cell groups" in the claim comprises the following meaning: an index of the first control resource pool is equal to one of 0 or 1; when an index of the first control resource pool is equal to 0 and a type of the first identity is a type other than the target identity type, the first serving cell belongs to a first cell group; when an index of the first control resource pool is equal to 1 and a type of the first identity is a type other than the target identity type, the first serving cell belongs to a second cell group; when a type of the first identity is the target identity type, the first serving cell belongs to a third cell group; the first cell group is a cell group in the X cell groups, the second cell group is a cell group in the X cell groups, and the third cell group is one of the X cell groups. In one subsidiary embodiment of the above embodiment, the target identity type is used for groupcast or broadcast services. In one subsidiary embodiment of the above embodiment, the target identity type corresponds to a specific RNTI value range. In one subsidiary embodiment of the above embodiment, the target identity type is one of a G-RNTI, an M-RNTI, an SC-RNTI and an SC-N-RNTI.

In one embodiment, the first control resource set belongs to a scheduling cell of the first serving cell.

In one embodiment, the first control resource set belongs to a BWP of a scheduling cell of the first serving cell in frequency domain.

In one embodiment, the first control resource set belongs to the first serving cell.

In one embodiment, the first control resource set belongs to a BWP of the first serving cell in frequency domain.

Embodiment 8

Figures 8, 9:
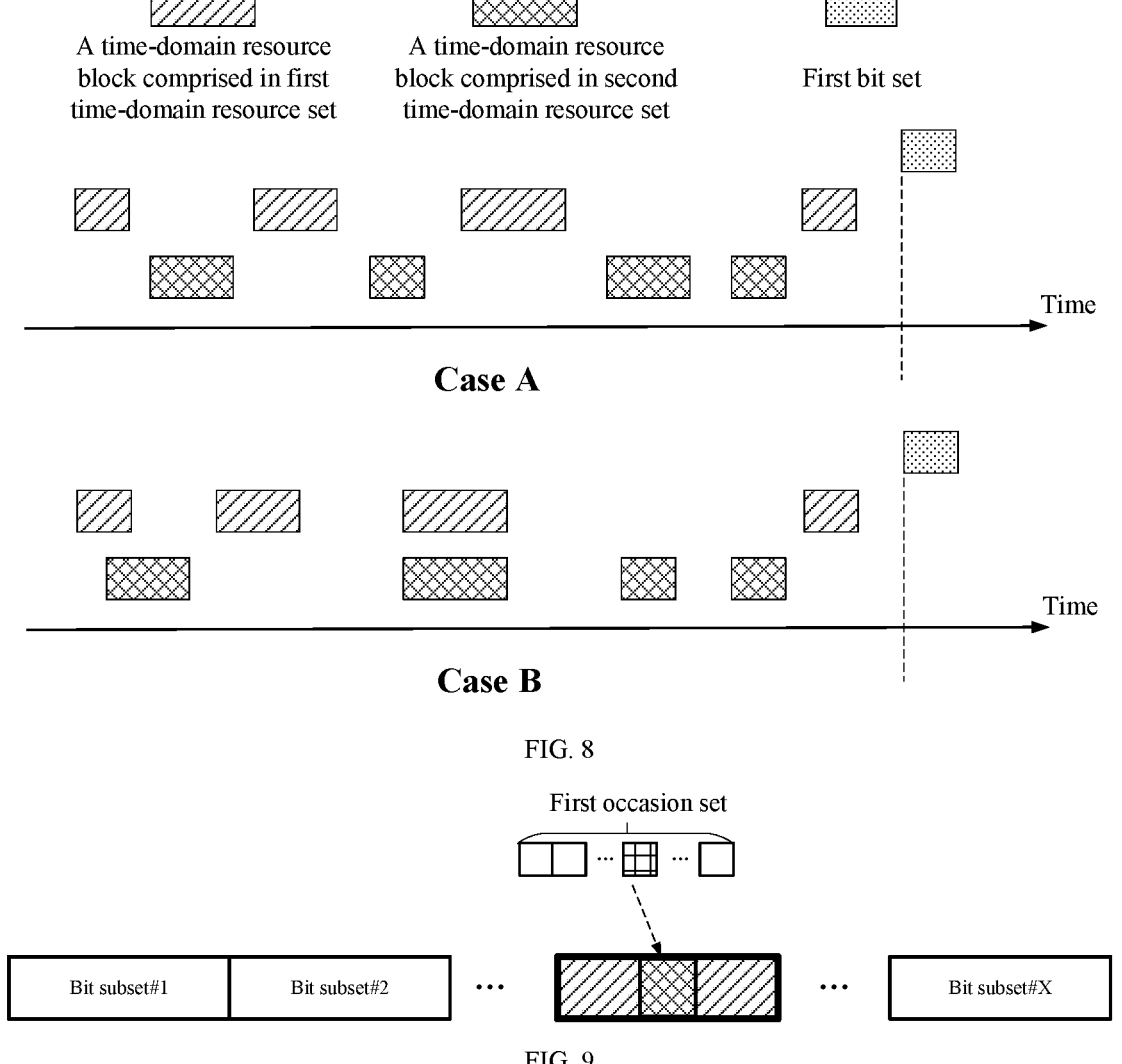
FIG. 8 illustrates a schematic diagram of a relation between a first time-domain resource set and a second time-domain resource set according to one embodiment of the present application.
FIG. 9 illustrates a schematic diagram of a first bit block according to one embodiment of the present application.

Embodiment 8 illustrates a schematic diagram of a relation between a first time-domain resource set and a second time-domain resource set according to one embodiment of the present application, as shown in FIG. 8. In FIG. 8, the horizontal axis represents time, in cases A and B, each slash-filled rectangle represents a time-domain resource block comprised in a first time-domain resource set, each cross-line-filled rectangle represents a time-domain resource block comprised in a second time-domain resource set, and the black-dot-filled rectangle represents a first bit set; in case A, there do not exist completely or partially overlapping time-domain resource blocks between a first time-domain resource set and a second time-domain resource set; in case B, there exist completely or partially overlapping time-domain resource blocks between a first time-domain resource set and a second time-domain resource set.

In embodiment 8, the first time-domain resource set in the present application comprises more than one time-domain resource block; the first control channel candidate in the present application is used to determine a target time-domain resource block, the target time-domain resource block belongs to a second time-domain resource set, and the second time-domain resource set comprises more than one time-domain resource block; whether there exist completely or partially overlapping time-domain resource blocks between the first time-domain resource set and the second time-domain resource set is used to determine the X cell groups in the present application.

In one embodiment, each time-domain resource block comprised in the first time-domain resource set is a candidate PDSCH occasion.

In one embodiment, each time-domain resource block comprised in the first time-domain resource set is a potential PDSCH occasion.

In one embodiment, each time-domain resource block comprised in the first time-domain resource set is a candidate PDSCH occasion to feed back a HARQ-ACK through the first bit set.

In one embodiment, each time-domain resource block comprised in the first time-domain resource set is a candidate PDSCH occasion corresponding to a HARQ-ACK bit comprised in the first bit set.

In one embodiment, each time-domain resource block comprised in the first time-domain resource set comprises a positive integer number of continuous time-domain symbols.

In one embodiment, a time-domain resource block comprised in the first time-domain resource set comprises time-domain discrete symbols.

In one embodiment, any two time-domain resource blocks comprised in the first time-domain resource set are different.

In one embodiment, the first time-domain resource set comprises two same time-domain resource blocks.

In one embodiment, there exist overlapping time-domain symbols between two time-domain resource blocks comprised in the first time-domain resource set.

In one embodiment, there do not exist overlapping time-domain symbols between any two time-domain resource blocks in the first time-domain resource set.

In one embodiment, the expression that "the first control channel candidate is used to determine a target time-domain resource block" in the claim comprises the following meaning: the first node in the present application assumes that the first control channel candidate is used to determine the target time-domain resource block.

In one embodiment, the expression that "the first control channel candidate is used to determine a target time-domain resource block" in the claim comprises the following meaning: a DCI potentially carried by the first control channel candidate is used to determine the target time-domain resource block.

In one embodiment, the expression that "the first control channel candidate is used to determine a target time-domain resource block" in the claim comprises the following meaning: when the first control channel candidate carries a DCI, a DCI carried by the first control channel candidate is used to determine the target time-domain resource block.

In one embodiment, the expression that "the first control channel candidate is used to determine a target time-domain resource block" in the claim comprises the following meaning: when the first control channel candidate is occupied by a PDCCH, a PDCCH occupying the first control channel candidate is used to determine the target time-domain resource block.

In one embodiment, the expression that "the first control channel candidate is used to determine a target time-domain resource block" in the claim comprises the following meaning: the first control channel candidate is used to indicate a time interval between a start time of the target time-domain resource block and an end time of time-domain resources occupied by the first control channel candidate.

In one embodiment, the expression that "the first control channel candidate is used to determine a target time-domain resource block" in the claim comprises the following meaning: the first control channel candidate is used to indicate a number of slot(s) and a number of time-domain symbol(s) comprised in a time interval between a start time of the target time-domain resource block and an end time of time-domain resources occupied by the first control channel candidate.

In one embodiment, each time-domain resource block comprised in the second time-domain resource set is a candidate PDSCH occasion.

In one embodiment, each time-domain resource block comprised in the second time-domain resource set is a candidate PDSCH occasion used for groupcast or multicast traffic.

In one embodiment, each time-domain resource block comprised in the second time-domain resource set is a candidate PDSCH occasion feeding back a HARQ-ACK through the first bit set.

In one embodiment, each time-domain resource block comprised in the second time-domain resource set is a candidate PDSCH occasion corresponding to a HARQ-ACK bit comprised in the first bit set.

In one embodiment, each time-domain resource block comprised in the second time-domain resource set comprises a positive integer number of continuous time-domain symbols.

In one embodiment, a time-domain resource block comprised in the second time-domain resource set comprises time-domain discrete symbols.

In one embodiment, any two time-domain resource blocks comprised in the second time-domain resource set are different.

In one embodiment, the second time-domain resource set comprises two same time-domain resource blocks.

In one embodiment, there exist overlapping time-domain symbols between two time-domain resource blocks comprised in the second time-domain resource set.

In one embodiment, there do not exist overlapping time-domain symbols between any two time-domain resource blocks in the second time-domain resource set.

In one embodiment, the first receiver receives a fourth information block, where the fourth information block is used to determine the second time-domain resource set. In one subsidiary embodiment of the above embodiment, a fourth information block and the second information block are two different IEs in a same RRC-layer signaling. In one subsidiary embodiment of the above embodiment, a fourth information block and the second information block are two different fields in a same IE in a same RRC-layer signaling. In one subsidiary embodiment of the above embodiment, a fourth information block and the second information block are two different RRC-layer signalings. In one subsidiary embodiment of the above embodiment, the fourth information block is used to indicate a Start and Length Indicator Value (SLIV), and the SLIV indicated by the fourth information block is used to determine the second time-domain resource set. In one subsidiary embodiment of the above embodiment, the fourth information block is used to indicate a time offset between downlink data and an uplink ACK/NACK, and the time offset between the downlink data and the uplink ACK/NACK indicated by the fourth information block is used to determine the second time-domain resource set. In one subsidiary embodiment of the above embodiment, the fourth information block comprises all or partial fields in an IE "PDSCH-TimeDomainAllocationListPTM" in an RRC signaling. In one subsidiary embodiment of the above embodiment, the fourth information block comprises all or partial fields in an IE "dl-DataToUL-ACK-PTM" in an RRC signaling. In one subsidiary embodiment of the above embodiment, the fourth information block comprises all or partial fields in an IE "dl-DataToUL-ACK-ForDCIFormat2_x1" in an RRC signaling, where x1 is a positive integer greater than 6.

In one embodiment, a type of the first search space set is used to determine whether the second time-domain resource set and the first time-domain resource set are the same.

In one embodiment, an index of the first search space set is used to determine whether the second time-domain resource set and the first time-domain resource set are the same.

In one embodiment, a DCI format adopted to monitor the first control channel candidate is used to determine whether the second time-domain resource set and the first time-domain resource set are the same.

In one embodiment, the first identity is used to determine whether the second time-domain resource set and the first time-domain resource set are the same.

In one embodiment, each time-domain resource block comprised in the first time-domain resource set is a candidate first-type PDSCH occasion, and each time-domain resource block comprised in the second time-domain resource set is a candidate second-type PDSCH occasion; the first-type PDSCH and the second-type PDSCH are different. In one subsidiary embodiment of the above embodiment, scrambling sequences of the first-type PDSCH and the second-type PDSCH are different. In one subsidiary embodiment of the above embodiment, initial values of scrambling sequence generators of the first-type PDSCH and the second-type PDSCH are different. In one subsidiary embodiment of the above embodiment, RNTIs corresponding to the first-type PDSCH and the second-type PDSCH are different. In one subsidiary embodiment of the above embodiment, the first-type PDSCH is used for a UE-specific PDSCH, and the second-type PDSCH is used for a PDSCH of groupcast or broadcast traffic.

In one embodiment, any time-domain resource block comprised in the first time-domain resource set and any time-domain resource block comprised in the second time-domain resource set are different.

In one embodiment, there exists a same time-domain resource block between the first time-domain resource set and the second time-domain resource set.

In one embodiment, time-domain resource blocks comprised in the first time-domain resource set and the second time-domain resource set are completely the same.

In one embodiment, the first time-domain resource set and the second time-domain resource set are different.

In one embodiment, a time-domain resource block comprised in the second time-domain resource set is a time-domain resource block other than a time-domain resource block comprised in the first time-domain resource set.

In one embodiment, a time-domain resource block comprised in the second time-domain resource set is different from any time-domain resource block comprised in the first time-domain resource set.

In one embodiment, the target time-domain resource block is a time-domain resource block comprised in the second time-domain resource set.

In one embodiment, the expression that "whether there exist completely or partially overlapping time-domain resource blocks between the first time-domain resource set and the second time-domain resource set is used to determine the X cell groups" in the claim comprises the following meaning: whether exist overlapping time-domain symbols between the first time-domain resource set and the second time-domain resource set is used to determine the X cell groups.

In one embodiment, the expression that "whether there exist completely or partially overlapping time-domain resource blocks between the first time-domain resource set and the second time-domain resource set is used to determine the X cell groups" in the claim comprises the following meaning: whether there exist completely or partially overlapping time-domain resource blocks between the first time-domain resource set and the second time-domain resource set is used by the first node in the present application to determine the X cell groups.

In one embodiment, the expression that "whether there exist completely or partially overlapping time-domain resource blocks between the first time-domain resource set and the second time-domain resource set is used to determine the X cell groups" in the claim comprises the following meaning: whether there exist completely or partially overlapping time-domain resource blocks between the first time-domain resource set and the second time-domain resource set is used by the first node in the present application to determine X.

In one embodiment, the expression that "whether there exist completely or partially overlapping time-domain resource blocks between the first time-domain resource set and the second time-domain resource set is used to determine the X cell groups" in the claim comprises the following meaning: when there do not exist completely or partially overlapping time-domain resource blocks between the first time-domain resource set and the second time-domain resource set, X is equal to 2; when there exist completely or partially overlapping time-domain resource blocks between the first time-domain resource set and the second time-domain resource set, X is equal to 3.

In one embodiment, the expression that "whether there exist completely or partially overlapping time-domain resource blocks between the first time-domain resource set and the second time-domain resource set is used to determine the X cell groups" in the claim comprises the following meaning: when there do not exist completely or partially overlapping time-domain resource blocks between the first time-domain resource set and the second time-domain resource set, X is equal to 1; when there exist completely or partially overlapping time-domain resource blocks between the first time-domain resource set and the second time-domain resource set, X is equal to 2;

In one embodiment, the expression that "whether there exist completely or partially overlapping time-domain resource blocks between the first time-domain resource set and the second time-domain resource set is used to determine the X cell groups" in the claim comprises the following meaning: when there do not exist completely or partially overlapping time-domain resource blocks between the first time-domain resource set and the second time-domain resource set and when a number of CORESET pool(s) provided to the first serving cell is equal to 1, X is equal to 1; when there do not exist completely or partially overlapping time-domain resource blocks between the first time-domain resource set and the second time-domain resource set and when a number of CORESET pool(s) provided to the first serving cell is equal to 2, X is equal to 2; when there exist completely or partially overlapping time-domain resource blocks between the first time-domain resource set and the second time-domain resource set and when a number of CORESET pool(s) provided to the first serving cell is equal to 2, X is equal to 3.

In one embodiment, a number of CORESET pool(s) provided to the first serving cell is used to determine the X cell groups.

In one embodiment, a number of CORESET pool(s) provided to the first serving cell is used to determine the X.

In one embodiment, the first transmitter transmits a sixth information block, herein, the sixth information block is used to indicate whether the first node supports that there exist completely or partially overlapping time-domain resource blocks between the first time-domain resource set and the second time-domain resource set. In one subsidiary embodiment of the above embodiment, the sixth information block comprises UE capability information. In one subsidiary embodiment of the above embodiment, the sixth information block is used to indicate whether the first node supports Frequency Division Multiplexing (FDM) of a groupcast PDSCH and a unicast PDSCH.

Embodiment 9

Embodiment 9 illustrates a schematic diagram of a first bit block according to one embodiment of the present application, as shown in FIG. 9. In FIG. 9, the cross-line-filled rectangle represents a first bit block, the slash-filled thick rectangle represents a first bit subset, and the reticle-filled rectangle represents a first time-domain occasion.

In embodiment 9, a first bit subset is one of the X bit subsets in the present application, the first bit subset comprises a first bit block, the first bit block comprises a positive integer number of bit(s), and any bit comprised in the first bit block belongs to the first bit subset; the first bit block corresponds to a first time-domain occasion, the first time-domain occasion is a time-domain occasion comprised in a first occasion set, the first occasion set comprises a positive integer number of time-domain occasion(s), and a position of the first time-domain occasion in the first occasion set is used to determine the first bit block from the first bit subset.

In one embodiment, the first bit subset comprises a bit other than the first bit block.

In one embodiment, the first bit block only comprises 1 bit.

In one embodiment, the first bit block comprises more than one bit.

In one embodiment, a number of bit(s) comprised in the first bit block is equal to 1.

In one embodiment, a number of bits comprised in the first bit block is greater than 1.

In one embodiment, the first bit block comprises a HARQ-ACK of a Transport Block (TB).

In one embodiment, the first bit block comprises a HARQ-ACK of a Code Block (CB).

In one embodiment, the first time-domain occasion is any time-domain occasion comprised in a first occasion set.

In one embodiment, the first time-domain occasion and the target time-domain resource block in the present application are the same.

In one embodiment, the first time-domain occasion and the target time-domain resource block in the present application are different.

In one embodiment, the target time-domain resource block in the present application is a time-domain occasion in the first occasion set.

In one embodiment, the target time-domain resource block in the present application is a time-domain occasion other than the first occasion set.

In one embodiment, any time-domain occasion comprised in the first occasion set is a candidate PDSCH occasion.

In one embodiment, any time-domain occasion comprised in the first occasion set is a candidate PDSCH Reception Occasion.

In one embodiment, any time-domain occasion comprised in the first occasion set is a candidate PDSCH reception occasion corresponding to an SLV.

In one embodiment, any time-domain occasion comprised in the first occasion set is a candidate PDSCH Reception Occasion used for groupcast or broadcast traffic.

In one embodiment, the first occasion set corresponds a PDSCH Time Domain Allocation List of groupcast or broadcast traffic.

In one embodiment, the first occasion set corresponds a PDSCH Time Domain Allocation List.

In one embodiment, any time-domain occasion comprised in the first occasion set is a time-domain resource block comprised in the first time-domain resource set in the present application.

In one embodiment, any time-domain occasion comprised in the first occasion set is a time-domain resource block comprised in the second time-domain resource set in the present application.

In one embodiment, the first occasion set and the first time-domain resource set are equivalent, any time-domain occasion comprised in the first occasion set is a time-domain resource block comprised in the first time-domain resource set in the present application, and any time-domain resource block comprised in the first time-domain resource set in the present application is a time-domain occasion comprised in the first occasion set.

In one embodiment, the first occasion set and the second time-domain resource set are equivalent, any time-domain occasion comprised in the first occasion set is a time-domain resource block comprised in the second time-domain resource set in the present application, and any time-domain resource block comprised in the second time-domain resource set in the present application is a time-domain occasion comprised in the first occasion set.

In one embodiment, the first occasion set and the first time-domain resource set are different.

In one embodiment, the first occasion set and the second time-domain resource set are different.

In one embodiment, the first occasion set is a subset of the first time-domain resource set.

In one embodiment, the first occasion set is a subset of the second time-domain resource set.

In one embodiment, any time-domain occasion comprised in the first occasion set comprises a positive integer number of time-domain symbol(s).

In one embodiment, any time-domain occasion comprised in the first occasion set comprises a positive integer number of continuous time-domain symbol(s).

In one embodiment, any two time-domain occasions comprised in the first occasion set belong to a same slot.

In one embodiment, time-domain symbols comprised in any two time-domain occasions comprised in the first occasion set belong to a same slot.

In one embodiment, all time-domain occasions comprised in the first occasion set belong to a same slot.

In one embodiment, two time-domain occasions comprised in the first occasion set respectively belong to different slots.

In one embodiment, the expression that "a position of the first time-domain occasion in the first occasion set is used to determine the first bit block from the first bit subset" in the claim comprises the following meaning: a position of the first time-domain occasion in the first occasion set is used by the first node in the present application to determine the first bit block from the first bit subset.

In one embodiment, the expression that "a position of the first time-domain occasion in the first occasion set is used to determine the first bit block from the first bit subset" in the claim comprises the following meaning: a position of the first time-domain occasion in the first occasion set is used to determine a position of the first bit block in the first bit subset from the first bit subset.

In one embodiment, the expression that "a position of the first time-domain occasion in the first occasion set is used to determine the first bit block from the first bit subset" in the claim comprises the following meaning: a position of the first time-domain occasion in the first occasion set is used to determine an index of a bit comprised in the first bit block in the first bit subset from the first bit subset.

In one embodiment, the expression that "a position of the first time-domain occasion in the first occasion set is used to determine the first bit block from the first bit subset" in the claim comprises the following meaning: a position of the first time-domain occasion in the first occasion set is used to determine a position of the first bit block in the first bit subset from the first bit subset according to a Type1 HARQ-ACK codebook.

In one embodiment, the expression that "a position of the first time-domain occasion in the first occasion set is used to determine the first bit block from the first bit subset" in the claim comprises the following meaning: a position of the first time-domain occasion in the first occasion set is used to determine a position of the first bit block in the first bit subset from the first bit subset according to a Pseudo-Code.

In one embodiment, the expression that "a position of the first time-domain occasion in the first occasion set is used to determine the first bit block from the first bit subset" in the claim comprises the following meaning: a position of the first time-domain occasion in the first occasion set is used to determine a position of the first bit block in the first bit subset from the first bit subset according to counting logic.

In one embodiment, a position of the first time-domain occasion in the first occasion set includes: an index of the first time-domain occasion in the first occasion set.

In one embodiment, time-domain occasions comprised in the first occasion set are sequentially indexed according to ascending order of start time, and a position of the first time-domain occasion in the first occasion set comprises: an index of the first time-domain occasion in the first occasion set.

In one embodiment, time-domain occasions comprised in the first occasion set are sequentially indexed according to descending order of start time, and a position of the first time-domain occasion in the first occasion set comprises: an index of the first time-domain occasion in the first occasion set.

In one embodiment, time-domain occasions comprised in the first occasion set are indexed according to ascending order of end time, and a position of the first time-domain occasion in the first occasion set comprises: an index of the first time-domain occasion in the first occasion set.

In one embodiment, time-domain occasions comprised in the first occasion set are sequentially indexed according to descending order of end time, and a position of the first time-domain occasion in the first occasion set comprises: an index of the first time-domain occasion in the first occasion set.

Embodiment 10

Embodiment 10 illustrates a schematic diagram of M occasion set(s) according to one embodiment of the present application, as shown in FIG. 10. In FIG. 10, the second column on the left to the fourth column on the left represent one of the M occasion set(s), and the fifth column on the left to the seventh column on the left represent another one of the M occasion set(s); $d_i$ (j) represents a number of slot(s) comprised in a time interval between a corresponding time-domain occasion and a scheduled PDCCH, and $S_i$ (j) and $L_i$ (j) respectively represent a start symbol and a time-domain occasion length (represented in a number of symbol(s)) in an SLIV of a corresponding time-domain occasion. M=2 in the embodiment does not limit the case that the present application supports M being greater than 2.

In embodiment 10, the first occasion set in the present application is one of M occasion set(s), and any of the M occasion set(s) comprises a positive integer number of time-domain occasion(s), M being a positive integer; when M is greater than 1, at least one of the first search space set in the present application or the first identity in the present application is used to determine the first occasion set from the M occasion set(s).

In one embodiment, M is equal to 2.
In one embodiment, M is equal to 3.
In one embodiment, M is equal to 4.
In one embodiment, M is equal to 5.
In one embodiment, M is greater than 5.
In one embodiment, all time-domain occasions comprised in any of the M occasion set(s) belong to multiple same slots.
In one embodiment, all time-domain occasions comprised in any of the M occasion set(s) belong to a same slot.

In one embodiment, any time-domain occasion comprised in any of the M occasion set(s) is a candidate PDSCH occasion.

In one embodiment, any time-domain occasion comprised in any of the M occasion set(s) is a candidate PDSCH reception occasion.

In one embodiment, any time-domain occasion comprised in any of the M occasion set(s) is a candidate PDSCH reception occasion corresponding to an SLIV.

In one embodiment, any time-domain occasion comprised in any of the M occasion set(s) is PDSCH time-domain resources that can be configured by a PDSCH time-domain resource allocation.

In one embodiment, any time-domain occasion comprised in any of the M occasion set(s) is a candidate PDSCH reception occasion corresponding to a group pf $K_0$ and SLIV.

In one embodiment, any time-domain occasion comprised in any of the M occasion set(s) is a time-domain resource block comprised in the first time-domain resource set in the present application or a time-domain resource block comprised in the second time-domain resource set in the present application.

In one embodiment, any time-domain occasion comprised in any of the M occasion set(s) comprises a positive integer number of time-domain symbol(s).

In one embodiment, any time-domain occasion comprised in any of the M occasion set(s) comprises a positive integer number of continuous time-domain symbols.

In one embodiment, there exist two time-domain occasions comprised in one of the M occasion set(s) respectively belonging to different slots.

In one embodiment, the M occasion set(s) respectively correspond to M PDSCH Time Domain Allocation Lists.

In one embodiment, there exists one of the M occasion set(s) corresponding to a PDSCH time-domain allocation list of groupcast or broadcast traffic.

In one embodiment, the second information block in the present application is used to determine the M occasion set(s).

In one embodiment, the second information block in the present application is used to determine M PDSCH time-domain allocation lists, and the M PDSCH time-domain allocation lists are respectively used to determine the M occasion set(s). In one subsidiary embodiment of the above embodiment, the second information block comprises M information sub-blocks, and the M information sub-blocks are used to respectively indicate the M PDSCH time-domain allocation lists.

In one embodiment, a fifth information block is used to determine the M occasion set(s), and the fifth information block belongs to an RRC layer signaling. In one subsidiary embodiment of the above embodiment, the fifth information block and the second information block in the present application respectively belong to two different RRC layer signalings. In one subsidiary embodiment of the above embodiment, the fifth information block and the second information block in the present application respectively belong to two different IEs in a same RRC layer signaling. In one subsidiary embodiment of the above embodiment, the fifth information block and the second information block in the present application respectively belong to two different fields in a same IE in a same RRC layer signaling. In one subsidiary embodiment of the above embodiment, the fifth information comprises M information sub-blocks, and the M information sub-blocks are respectively used to determine the M occasion set(s).

In one embodiment, when a first configuration block is provided, the first occasion set is a occasion set configured by the first configuration information block; when the first configuration information block is not provided and a second configuration information block is provided, the first occasion set is an occasion set configured by the second configuration information block; when neither the first configuration information block nor the second configuration information block is provided and the third configuration information block is provided, the first occasion set is an occasion set configured by the third configuration information block; when the first configuration information block, the second configuration information block and the third configuration information block are not provided, the first occasion set is a default occasion set; the first configuration information block is an IE or field in an RRC signaling, the second configuration information block is an IE or field in an RRC signaling, and the third configuration information block is an IE or field in an RRC signaling. In one subsidiary embodiment of the above embodiment, any two of the first configuration information block, the second configuration information block and the third configuration information block are different. In one subsidiary embodiment of the above embodiment, the first configuration information block and the second configuration information block are UE dedicated, and the third configuration information block is common. In one subsidiary embodiment of the above embodiment, the first configuration information block and the second configuration information block are two different IEs or fields in a same RRC signaling, and the third configuration information block and the first configuration information block respectively belong to two different RRC signalings. In one subsidiary embodiment of the above embodiment, the first configuration information block comprises "pdsch-TimeDomainAllocationListForPTM" in "pdsch-Config", the second configuration information block comprises "pdsch-TimeDomainAllocationList" in "pdsch-Config", and the third information block comprises "pdsch-TimeDomainAllocationList" in "pdsch-ConfigCommon". In one subsidiary embodiment of the above embodiment, the first configuration information block comprises "pdsch-TimeDomainAllocationList-DCI-2-x1-r17" in "pdsch-Config", the second configuration information block comprises "pdsch-TimeDomainAllocationList" in "pdsch-Config", and the third information block comprises "pdsch-TimeDomain-AllocationList" in "pdsch-ConfigCommon", x1 being a positive integer greater than 6.

In one embodiment, the expression that "at least one of the first search space set or the first identity is used to determine the first occasion set from the M occasion set(s)" in the claim comprises the following meaning: at least one of the first search space set or the first identity is used by the first node in the present application to determine the first occasion set from the M occasion set(s).

In one embodiment, the expression that "at least one of the first search space set or the first identity is used to determine the first occasion set from the M occasion set(s)" in the claim comprises the following meaning: a type of the first search space set is used to determine the first occasion set from the M occasion set(s).

In one embodiment, the expression that "at least one of the first search space set or the first identity is used to determine the first occasion set from the M occasion set(s)" in the claim comprises the following meaning: a DCI format comprised in the first search space set is used to determine the first occasion set from the M occasion set(s).

In one embodiment, the expression that "at least one of the first search space set or the first identity is used to determine the first occasion set from the M occasion set(s)" in the claim comprises the following meaning: a type of the first identity is used to determine the first occasion set from the M occasion set(s).

In one embodiment, the expression that "at least one of the first search space set or the first identity is used to determine the first occasion set from the M occasion set(s)" in the claim comprises the following meaning: a value range of the first identity is used to determine the first occasion set from the M occasion set(s).

Embodiment 11

Embodiment 11 illustrates a schematic diagram of a first signal according to one embodiment of the present application, as shown in FIG. 11. In FIG. 11, the slash-filled rectangle represents a first signal, the reticle-filled rectangle represents a first control channel candidate, and the cross-line-filled rectangle represents one of X bit subsets indicating whether a first signal is correctly received.

In embodiment 11, information carried by the first control channel candidate in the present application is used to determine time-frequency resources occupied by the first signal in the present application; the first identity in the present application is used for a scrambling sequence of the first signal, the first signal belongs to the first serving cell in the present application, and one of the X bit subsets in the present application is used to indicate whether the first signal is correctly received.

In one embodiment, the first signal is a radio signal.

In one embodiment, the first signal is a baseband signal.

In one embodiment, the first signal is a Radio Frequency (RF) signal.

In one embodiment, the first signal is transmitted via an air interface.

In one embodiment, the first signal is transmitted via a radio interface.

In one embodiment, the first signal is transmitted via a Uu interface.

In one embodiment, the first signal is transmitted via a PC5 interface.

In one embodiment, a transmitter of the first signal comprises the second node in the present application.

In one embodiment, the first signal is transmitted through a Downlink Shared Channel (DL-SCH).

In one embodiment, the first signal is transmitted through a Physical Downlink Shared Channel (PDSCH).

In one embodiment, the first signal is Groupcast/Multicast.

In one embodiment, the first signal is unicast.

In one embodiment, the first signal is transmitted through a Physical Multicast Channel (PMCH).

In one embodiment, the first signal is used to transmit a Multicast Control Channel (MCCH).

In one embodiment, the first signal is used to transmit a Multicast Traffic Channel (MTCH).

In one embodiment, the first signal is used to transmit a Single Cell Multicast Control Channel (SC-MCCH).

In one embodiment, the first signal is used to transmit a Single Cell Multicast Traffic Channel (SC-MTCH).

In one embodiment, all or partial bits in a Transport Block (TB) are used to generate the first signal.

In one embodiment, the first signal is used to carry all or partial bits in a Transport Block (TB).

In one embodiment, all or partial bits in a Code Block Group (CBG) are used to generate the first signal.

In one embodiment, the first signal belongs to an initial transmission of a Hybrid Automatic Repeat Request (HARQ) process.

In one embodiment, the first signal belongs to a retransmission of a HARQ process.

In one embodiment, the first signal is transmitted through a Semi-Persistent Scheduling (SPS) PDSCH transmission.

In one embodiment, the first signal comprises a reference signal.

In one embodiment, the first signal comprises a Shared Channel (SCH) and a reference signal.

In one embodiment, time-domain resources occupied by the first signal is after time-domain resources occupied by the first control channel candidate.

In one embodiment, the first signal occupies the target time-domain resource block in the present application.

In one embodiment, information carried by the first control information candidate is DCI.

In one embodiment, information carried by the first control information candidate is physical-layer information.

In one embodiment, information carried by the first control channel candidate is activation information of a Semi-Persistent (SPS) PDSCH.

In one embodiment, the expression that "information carried by the first control channel candidate is used to determine time-frequency resources occupied by the first signal" in the claim comprises the following meaning: information carried by the first control channel candidate is used by the first node in the present application to determine time-frequency resources occupied by the first signal.

In one embodiment, the expression that "information carried by the first control channel candidate is used to determine time-frequency resources occupied by the first signal" in the claim comprises the following meaning: information carried by the first control channel candidate is used to explicitly indicate time-frequency resources occupied by the first signal.

In one embodiment, the expression that "information carried by the first control channel candidate is used to determine time-frequency resources occupied by the first signal" in the claim comprises the following meaning: information carried by the first control channel candidate is used to implicitly indicate time-frequency resources occupied by the first signal.

In one embodiment, the expression that "information carried by the first control channel candidate is used to determine time-frequency resources occupied by the first signal" in the claim comprises the following meaning: two fields comprised in information carried by the first control channel candidate are used to respectively indicate time-domain resources and frequency-domain resources occupied by the first signal.

In one embodiment, the expression that "the first identity is used for a scrambling sequence of the first signal" in the claim comprises the following meaning: the first identity is used to generate a scrambling sequence of the first signal.

In one embodiment, the expression that "the first identity is used for a scrambling sequence of the first signal" in the claim comprises the following meaning: the first identity is used to initialize a scrambling sequence generator of the first signal.

In one embodiment, the expression that "the first identity is used for a scrambling sequence of the first signal" in the claim comprises the following meaning: the first identity is used to calculate an initial value of a scrambling sequence generating register of the first signal.

In one embodiment, the expression that "the first signal belongs to the first serving cell" in the claim comprises the following meaning: frequency-domain resources occupied by the first signal belong to the first serving cell.

In one embodiment, the expression that "the first signal belongs to the first serving cell" in the claim comprises the following meaning: frequency-domain resources occupied by the first signal belong to a carrier corresponding to the first serving cell.

In one embodiment, the expression that "the first signal belongs to the first serving cell" in the claim comprises the following meaning: frequency-domain resources occupied by the first signal belong to a BWP comprised in the first serving cell.

In one embodiment, the expression that "the first signal belongs to the first serving cell" in the claim comprises the following meaning: an ID of the first serving cell is used to initialize a scrambling sequence generator of the first signal.

In one embodiment, only one of the X bit subsets is used to indicate whether the first signal is correctly received.

In one embodiment, only one of the X bit subsets is used to indicate a HARQ-ACK of the first signal.

In one embodiment, only one of the X bit subsets is used to comprise an ACK/NACK for the first signal.

In one embodiment, at least one of the first search space set or the first identity is used to determine a bit subset indicating whether the first signal is correctly received from the X bit subsets.

In one embodiment, a type of the first search space set is used to determine a target cell group from the X cell groups, the first serving cell belongs to a target cell group, and one of the X bit subsets for the target cell group is used to indicate whether the first signal is correctly received.

In one embodiment, an index of the first search space set is used to determine a target cell group from the X cell groups, the first serving cell belongs to a target cell group, and one of the X bit subsets for the target cell group is used to indicate whether the first signal is correctly received.

In one embodiment, a DCI format comprised in the first search space set is used to determine a target cell group from the X cell groups, the first serving cell belongs to a target cell group, and one of the X bit subsets for the target cell group is used to indicate whether the first signal is correctly received.

In one embodiment, a DCI format that the first control channel candidate is successfully detected is used to determine a bit subset indicating whether the first signal is correctly received from the X bit subsets.

In one embodiment, a DCI format scheduling the first signal is used to determine a bit subset indicating whether the first signal is correctly received from the X bit subsets.

In one embodiment, an RNTI adopted by a DCI format scheduling the first signal is used to determine a bit subset indicating whether the first signal is correctly received from the X bit subsets.

In one embodiment, the first identity is used to determine a target cell group from the X cell groups, the first serving cell belongs to a target cell group, and a bit subset for the target cell group among the X bit subsets is used to indicate whether the first signal is correctly received.

In one embodiment, a type of the first identity is used to determine a bit subset indicating whether the first signal is correctly received from the X bit subsets.

In one embodiment, a value range of the first identity is used to determine a bit subset indicating whether the first signal is correctly received from the X bit subsets.

In one embodiment, an index of a bit subset indicating whether the first signal is correctly received among the X bit subsets is signaling explicitly configured.

Embodiment 12

Figure 12:
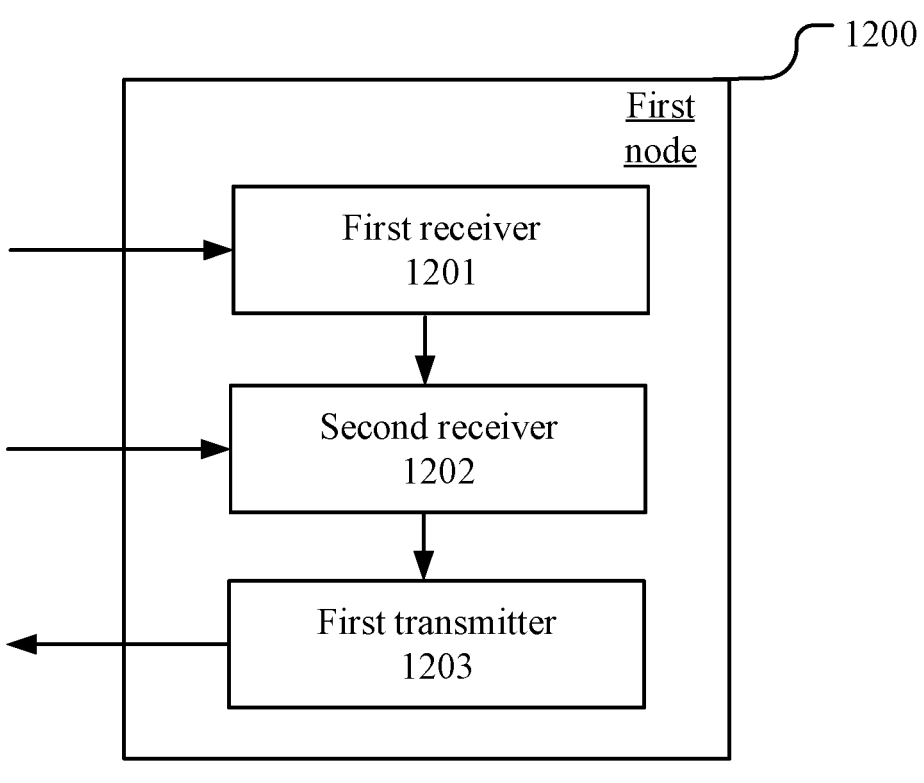
FIG. 12 illustrates a structure block diagram of a processor in a first node according to one embodiment of the present application.

Embodiment 12 illustrates the structure diagram of a processor in a first node, as shown in FIG. 12. In FIG. 12, a processor 1200 of a first node comprises a first receiver 1201, a second receiver 1202 and a first transmitter 1203. The first receiver 1201 comprises the transmitter/receiver 456 (including the antenna 460), the receiving processor 452 and the controller/processor 490 in FIG. 4 of the present application; the second receiver 1202 comprises the transmitter/receiver 456 (including the antenna 460), the receiving processor 452 and the controller/processor 490 in FIG. 4 of the present application; the first transmitter 1203 comprises the transmitter/receiver 456 (including the antenna 460) and the transmitting processor 455 in FIG. 4 of the present application.

In embodiment 12, the first receiver 1201 receives a first information block, the first information block is used to determine a first search space set, the first search space set comprises a positive integer number of control channel candidate(s); the second receiver 1202 monitors a first control channel candidate, the first control channel candidate is one of a positive integer number of control channel candidate(s) comprised in the first search space set; the first transmitter 1203 transmits a first bit set, the first bit set comprises X bit subsets, each of the X bit subsets comprises a positive integer number of HARQ-ACK bit(s), X being a positive integer greater than 1; herein, the X bit subsets are respectively for X cell groups, and any of the X cell groups comprises a positive integer number of serving cell(s); the first control channel candidate is used for a first serving cell, and the first serving cell belongs to one or multiple cell groups among the X cell groups; the first control channel candidate is used to determine a first identity, and at least one of the first search space set or the first identity is used to determine at least a cell group to which the first serving cell belongs from the X cell groups.

In one embodiment, the X cell groups are sequentially indexed, and at least one of the first search space set or the first identity is used to determine an index of at least a cell group to which the first serving cell belongs; the X bit subsets are concatenated to generate the first bit set, and an order of indexes of the X cell groups is used to determine a concatenation order of the X bit subsets.

In one embodiment, the first search space set is associated with a first control resource set, the first control resource set belongs to a first control resource pool, and an index of the first control resource pool is used to determine a cell group to which the first serving cell belongs from the X cell groups.

In one embodiment, the first receiver 1201 receives a second information block, herein, the second information block is used to determine a first time-domain resource set, and the first time-domain resource set comprises more than one time-domain resource block; the first control channel candidate is used to determine a target time-domain resource block, the target time-domain resource block belongs to a second time-domain resource set, and the second time-domain resource set comprises more than one time-domain resource block; whether there exist completely or partially overlapping time-domain resource blocks between the first time-domain resource set and the second time-domain resource set is used to determine the X cell groups.

In one embodiment, a first bit subset is one of the X bit subsets, the first bit subset comprises a first bit block, the first bit block comprises a positive integer number of bit(s), and any bit comprised in the first bit block belongs to the first bit subset; the first bit block corresponds to a first time-domain occasion, the first time-domain occasion is a time-domain occasion comprised in a first occasion set, the first occasion set comprises a positive integer number of time-domain occasion(s), and a position of the first time-domain occasion in the first occasion set is used to determine the first bit block from the first bit subset.

In one embodiment, the first occasion set is one of M occasion set(s), and any of the M occasion set(s) comprises a positive integer number of time-domain occasion(s), M being a positive integer; when M is greater than 1, at least one of the first search space set or the first identity is used to determine the first occasion set from the M occasion set(s).

In one embodiment, the second receiver 1202 receives a first signal, and information carried by the first control channel candidate is used to determine time-frequency resources occupied by the first signal; the first identity is used for a scrambling sequence of the first signal, the first signal belongs to the first serving cell, and one of the X bit subsets is used to indicate whether the first signal is correctly received.

Embodiment 13

Figure 13:
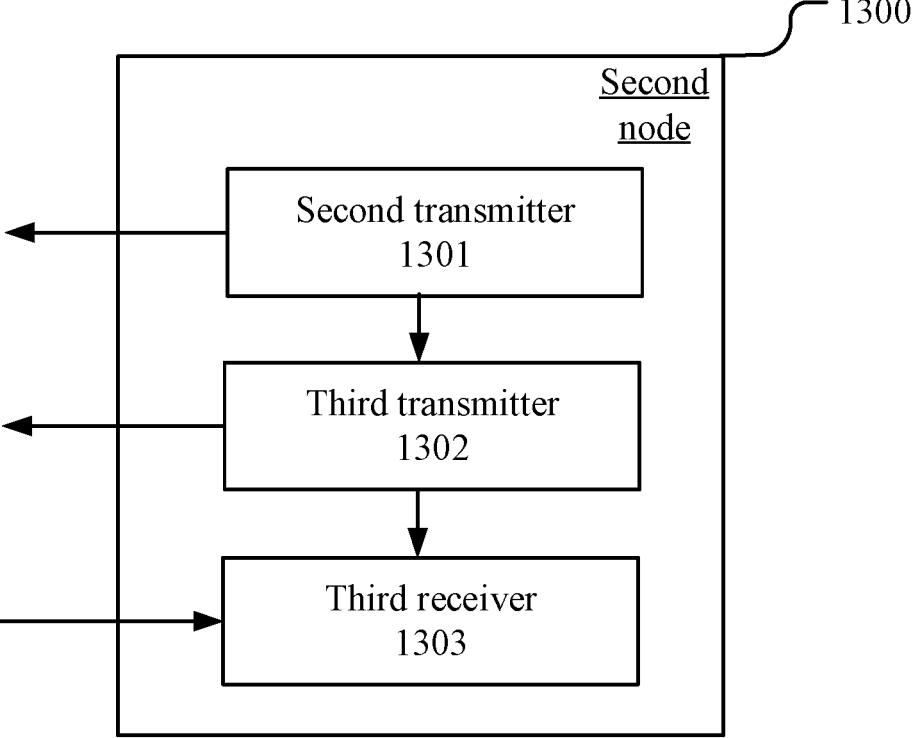
FIG. 13 illustrates a structure block diagram of a processor in second node according to one embodiment of the present application.

Embodiment 13 illustrates the structure diagram of a processor in a second node, as shown in FIG. 13. In FIG. 13, a processor 1300 of the second node comprises a second transmitter 1301, a third transmitter 1302 and a third receiver 1303. The second transmitter 1301 comprises the transmitter/receiver 416 (including the antenna 460), the transmitting processor 415 and the controller/processor 440 in FIG. 4 of the present application; the third transmitter 1302 comprises the transmitter/receiver 416 (including the antenna 460), the transmitting processor 415 and the controller/processor 440 in FIG. 4 of the present application; the third receiver 1303 comprises the transmitter/receiver 416 (including the antenna 460) and the receiving processor 412 in FIG. 4 of the present application.

In embodiment 13, the second transmitter 1301 transmits a first information block, the first information block is used to indicate a first search space set, the first search space set comprises a positive integer number of control channel candidate(s); the third transmitter 1302 determines a first control channel candidate, the first control channel candidate is one of a positive integer number of control channel candidate(s) comprised in the first search space set; the third receiver 1303 receives a first bit set, the first bit set comprises X bit subsets, each of the X bit subsets comprises a positive integer number of HARQ-ACK bit(s), X being a positive integer greater than 1; herein, the X bit subsets are respectively for X cell groups, and any of the X cell groups comprises a positive integer number of serving cell(s); the first control channel candidate is used for a first serving cell, and the first serving cell belongs to one or multiple cell groups among the X cell groups; the first control channel candidate is used to determine a first identity, and at least one of the first search space set or the first identity is used to determine at least a cell group to which the first serving cell belongs from the X cell groups.

In one embodiment, the X cell groups are sequentially indexed, and at least one of the first search space set or the first identity is used to determine an index of at least a cell group to which the first serving cell belongs; the X bit subsets are concatenated to generate the first bit set, and an order of indexes of the X cell groups is used to determine a concatenation order of the X bit subsets.

In one embodiment, the first search space set is associated with a first control resource set, the first control resource set belongs to a first control resource pool, and an index of the first control resource pool is used to determine a cell group to which the first serving cell belongs from the X cell groups.

In one embodiment, the second transmitter 1301 transmits a second information block; wherein the second information block is used to indicate a first time-domain resource block, and the first time-domain resource set comprises more than one time-domain resource block; the first control channel candidate is used to determine a target time-domain resource block, the target time-domain resource block belongs to a second time-domain resource set, and the second time-domain resource set comprises more than one time-domain resource block; whether there exist completely or partially overlapping time-domain resource blocks between the first time-domain resource set and the second time-domain resource set is used to determine the X cell groups.

In one embodiment, a first bit subset is one of the X bit subsets, the first bit subset comprises a first bit block, the first bit block comprises a positive integer number of bit(s), and any bit comprised in the first bit block belongs to the first bit subset; the first bit block corresponds to a first time-domain occasion, the first time-domain occasion is a time-domain occasion comprised in a first occasion set, the first occasion set comprises a positive integer number of time-domain occasion(s), and a position of the first time-domain occasion in the first occasion set is used to determine the first bit block from the first bit subset.

In one embodiment, the first occasion set is one of M occasion set(s), and any of the M occasion set(s) comprises a positive integer number of time-domain occasion(s), M being a positive integer; when M is greater than 1, at least one of the first search space set or the first identity is used to determine the first occasion set from the M occasion set(s).

In one embodiment, the third transmitter 1302 transmits a first signal; herein, information carried by the first control channel candidate is used to determine time-frequency resources occupied by the first signal; the first identity is used for a scrambling sequence of the first signal, the first signal belongs to the first serving cell, and one of the X bit subsets is used to indicate whether the first signal is correctly received.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node or the second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, test device, test equipment, test instrument and other wireless communication devices. The base station or network side equipment in the present application includes but is not limited to macro-cellular base stations, micro-cellular base stations, home base stations, relay base station, eNB, gNB, Transmitter Receiver Point (TRP), relay satellites, satellite base stations, space base stations, test device, test equipment, test instrument and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE), comprising:
   a receiver configured to receive a radio resource control (RRC) information element (IE) indicating a first search space set having one or more control channel candidates, wherein the UE is configured to monitor a first control channel candidate of the one or more control channel candidates; and
   a transmitter configured to transmit a set of bits that includes a plurality of subsets of hybrid automatic repeat request-acknowledgement (HARQ-ACK) bits, wherein the plurality of subsets of HARQ-ACK bits are respectively associated with a plurality of cell groups, each cell group of the plurality of cell groups includes one or more serving cells, and the first control channel candidate is associated with a first serving cell that is part of a cell group of the plurality of cell groups, wherein the first control channel candidate indicates the cell group of the first serving cell,
   wherein the transmitter is configured to transmit an information block that indicates whether the UE supports frequency-division multiplexing of a groupcast physical downlink shared channel (PDSCH) and a unicast PDSCH.

2. The UE according to claim 1, wherein the plurality of cell groups are sequentially indexed, and the first control channel candidate is used to determine an index of the cell group of the first serving cell, the plurality of subsets of HARQ-ACK bits are concatenated to generate the set of bits, and an order of indices of the plurality of X cell groups is used to determine a concatenation order of the plurality of subsets of HARQ-ACK bits.

3. The UE according to claim 1, wherein whether a downlink control information (DCI) format for monitoring a control channel candidate of the first search space set includes a DCI format scheduling groupcast or multicast traffic is used to determine at least the cell group of the first serving cell.

4. The UE according to claim 1, wherein a first bit subset of HARQ-ACK bits of the plurality of X bit subsets of HARQ-ACK bits includes the first bit block corresponds to a first time-domain occasion, the first time-domain occasion is a time-domain occasion of a first occasion set, the first occasion set includes multiple time-domain occasions, and a position of the first time-domain occasion in the first occasion set is used to determine the first bit block from the first bit subset of HARQ-ACK bits.

5. The UE according to claim 4, wherein the first occasion set is one of a plurality of occasion sets that each includes one or more time-domain occasions, and the first control channel candidate is used to determine the first occasion set from the plurality of occasion sets.

6. The UE according to claim 1, wherein the receiver is configured to receive a first signal, and information carried by the first control channel candidate is used to determine time-frequency resources occupied by the first signal, a first identity is used for a scrambling sequence of the first signal, the first signal belongs to the first serving cell, and one of the plurality of subsets of HARQ-ACK bits is used to indicate whether the first signal is correctly received.

7. A base station, comprising:
a transmitter configured to transmit a radio resource control (RRC) information element (IE) indicating a first search space set having one or more control channel candidates, the one or more control channel candidates including a first control channel candidate; and
a receiver configured to receive a set of bits that includes a plurality of subsets of hybrid automatic repeat request-acknowledgement (HARQ-ACK) bits, wherein the plurality of subsets of HARQ-ACK bits are respectively associated with a plurality of cell groups, each cell group of the plurality of cell groups includes one or more serving cells, and the first control channel candidate is associated with a first serving cell that is part of a cell group of the plurality of cell groups, wherein control information of the first control channel candidate indicates the cell group of the first serving cell,
wherein the receiver is configured to receive an information block that indicates whether a user equipment supports frequency-division multiplexing of a groupcast physical downlink shared channel (PDSCH) and a unicast PDSCH.

8. The base station according to claim 7, wherein the plurality of cell groups are sequentially indexed, and the first control channel candidate is used to determine an index of the cell group of the first serving cell, the plurality of subsets of HARQ-ACK bits are concatenated to generate the set of bits, and an order of indices of the plurality of X cell groups is used to determine a concatenation order of the plurality of subsets of HARQ-ACK bits.

9. The base station according to claim 7, wherein whether a downlink control information (DCI) format for monitoring a control channel candidate of the first search space set includes a DCI format scheduling groupcast or multicast traffic is used to determine at least the cell group of the first serving cell.

10. The base station according to claim 7, wherein a first subset of HARQ-ACK bits of the plurality of subsets of HARQ-ACK bits includes a first bit block, the first bit block corresponds to a first time-domain occasion, the first time-domain occasion is a time-domain occasion of a first occasion set, the first occasion set includes multiple time-domain occasions, and a position of the first time-domain occasion in the first occasion set is used to determine the first bit block from the first subset of HARQ-ACK bits.

11. The base station according to claim 7, wherein the transmitter is configured to transmit a first signal, and information carried by the first control channel candidate is used to determine time-frequency resources occupied by the first signal, a first identity is used for a scrambling sequence of the first signal, the first signal belongs to the first serving cell, and one of the plurality of subsets of HARQ-ACK bits is used to indicate whether the first signal is correctly received.

12. A method, comprising:
receiving a radio resource control (RRC) information element (IE) indicating a first search space set having one or more control channel candidates;
monitoring a first control channel candidate of the one or more control channel candidates;
transmitting a set of bits that includes a plurality of subsets of hybrid automatic repeat request-acknowledgement (HARQ-ACK) bits, wherein the plurality of subsets of HARQ-ACK bits are respectively associated with a plurality of cell groups, each cell group of the plurality of cell groups includes one or more serving cells, and the first control channel candidate is associated with a first serving cell that is part of a cell group of the plurality of cell groups, wherein control information of the first control channel candidate indicates a cell group of the first serving cell; and
transmitting an information block that indicates whether a user equipment supports frequency-division multiplexing of a groupcast physical downlink shared channel (PDSCH) and a unicast PDSCH.

13. The method according to claim 12, wherein the plurality of cell groups are sequentially indexed, and the first control channel candidate is used to determine an index of the cell group of the first serving cell, the plurality of subsets of HARQ-ACK bits are concatenated to generate the set of bits, and an order of indices of the plurality of X-cell groups is used to determine a concatenation order of the plurality of subsets of HARQ-ACK bits.

14. The method according to claim 12, wherein whether a downlink control information (DCI) format for monitoring a control channel candidate of the first search space set includes a DCI format scheduling groupcast or multicast traffic is used to determine at least the cell group of to which the first serving cell.

15. The method according to claim 12, wherein a first bit subset of HARQ-ACK bits of the plurality of subsets of HARQ-ACK bits includes a first bit block, the first bit block corresponds to a first time-domain occasion, the first time-domain occasion is a time-domain occasion of a first occasion set, the first occasion set includes multiple time-domain occasions, and a position of the first time-domain occasion in the first occasion set is used to determine the first bit block from the first subset of HARQ-ACK bits.

16. The method according to claim 15, wherein the first occasion set is one of a plurality of occasion sets that each includes one or more time-domain occasions, and the first control channel candidate is used to determine the first occasion set from the plurality of occasion sets.

17. The method according to claim 12, comprising:
receiving a first signal,
wherein information carried by the first control channel candidate is used to determine time frequency resources occupied by the first signal, a first identity is used for a scrambling sequence of the first signal, the first signal belongs to the first serving cell, and one of the plurality of subsets of HARQ-ACK bits is used to indicate whether the first signal is correctly received.

* * * * *